(12) United States Patent
Yoshikawa

(10) Patent No.: US 10,150,082 B2
(45) Date of Patent: Dec. 11, 2018

(54) CATALYST FOR INTERNAL COMBUSTION ENGINE EXHAUST GAS PURIFICATION, AND SYSTEM FOR SAME

(71) Applicant: UMICORE SHOKUBAI JAPAN CO., LTD., Tokoname-shi, Aichi (JP)

(72) Inventor: Tatsuya Yoshikawa, Himeji (JP)

(73) Assignee: UMICORE SHOKUBAI JAPAN CO., LTD., Tokoname-Shi, Aichi (JP)

( * ) Notice: Subject to any disclaimer, the term of this patent is extended or adjusted under 35 U.S.C. 154(b) by 118 days.

(21) Appl. No.: 15/314,135

(22) PCT Filed: May 28, 2015

(86) PCT No.: PCT/JP2015/065475
§ 371 (c)(1),
(2) Date: Nov. 28, 2016

(87) PCT Pub. No.: WO2015/182726
PCT Pub. Date: Dec. 3, 2015

(65) Prior Publication Data
US 2017/0197179 A1      Jul. 13, 2017

(30) Foreign Application Priority Data
May 28, 2014   (JP) .................... 2014-110556

(51) Int. Cl.
*B01D 53/94*        (2006.01)
*B01J 23/10*        (2006.01)
(Continued)

(52) U.S. Cl.
CPC .......... *B01D 53/945* (2013.01); *B01J 23/002* (2013.01); *B01J 23/10* (2013.01); *B01J 23/63* (2013.01);
(Continued)

(58) Field of Classification Search
None
See application file for complete search history.

(56) References Cited

U.S. PATENT DOCUMENTS 5,376,610 A   12/1994   Takahata et al.
5,494,881 A    2/1996   Machida et al.
(Continued)

FOREIGN PATENT DOCUMENTS

JP   A-H05-293376   11/1993
JP   A-H07-039761    2/1995
(Continued)

OTHER PUBLICATIONS

Shigetsu et al. JP2009-007942A—translated document (Year: 2009).*
(Continued)

*Primary Examiner* — Walter D. Griffin
*Assistant Examiner* — Jelitza M Perez
(74) *Attorney, Agent, or Firm* — Dickinson Wright PLLC

(57) ABSTRACT

A catalyst and system for an internal combustion engine exhaust gas purification includes a first catalyst component region (a) having a catalyst component layer containing Rh at a concentration of 0.1 to 3.0 g/L at a length of 3 to 30 mm on an upstream side, a second catalyst component region (b) having a catalyst component layer containing Pd at a concentration of 1.0 to 20.0 g/L at a length of 10 to 100 mm on a downstream side, and a third catalyst region (c) containing rhodium at a concentration of 0.05 to 1.0 g/L and an oxygen storage material at a concentration of 30 to 150 g/L at a length of 25 to 150 mm on a monolithic support. The catalyst suppresses the formation and discharge of $N_2O$ from the exhaust gas with a small amount of a noble metal from the time of cold starting.

14 Claims, 18 Drawing Sheets

(51) Int. Cl.
  *B01J 23/63* (2006.01)
  *B01J 35/00* (2006.01)
  *B01J 35/04* (2006.01)
  *B01J 37/02* (2006.01)
  *B01J 37/08* (2006.01)
  *F01N 3/10* (2006.01)
  *F01N 3/28* (2006.01)
  *B01J 23/00* (2006.01)

(52) U.S. Cl.
  CPC ........... *B01J 35/0006* (2013.01); *B01J 35/04* (2013.01); *B01J 37/0215* (2013.01); *B01J 37/0236* (2013.01); *B01J 37/0244* (2013.01); *B01J 37/08* (2013.01); *F01N 3/101* (2013.01); *F01N 3/2807* (2013.01); *B01D 2255/1023* (2013.01); *B01D 2255/1025* (2013.01); *B01D 2255/204* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/20715* (2013.01); *B01D 2255/407* (2013.01); *B01D 2255/903* (2013.01); *B01D 2255/908* (2013.01); *B01D 2255/9022* (2013.01); *B01J 2523/00* (2013.01); *F01N 3/2828* (2013.01); *F01N 2330/02* (2013.01); *F01N 2330/60* (2013.01); *F01N 2370/02* (2013.01); *F01N 2510/0682* (2013.01); *F01N 2510/0684* (2013.01); *Y02C 20/10* (2013.01); *Y02T 10/22* (2013.01)

(56) References Cited

U.S. PATENT DOCUMENTS

| | | | |
|---|---|---|---|
| 7,585,478 B2* | 9/2009 | Shirahata | B01D 46/0024 423/213.5 |
| 2004/0001781 A1* | 1/2004 | Kumar | B01J 23/44 422/180 |
| 2005/0031501 A1 | 2/2005 | Kawai et al. | |
| 2006/0270550 A1 | 11/2006 | Shimizu et al. | |
| 2012/0031085 A1 | 2/2012 | Zhang et al. | |
| 2013/0310248 A1 | 11/2013 | Aoki et al. | |

FOREIGN PATENT DOCUMENTS

| | | |
|---|---|---|
| JP | A-H09-085091 | 3/1997 |
| JP | A-2004-283692 | 10/2004 |
| JP | A-2006-326428 | 12/2006 |
| JP | 2009007942 A * | 1/2009 |
| JP | A-2009-007942 | 1/2009 |
| JP | A-2012-035206 | 2/2012 |
| JP | A-2012-152702 | 8/2012 |

OTHER PUBLICATIONS

International Search Report and Written Opinion dated May 28, 2015 which issued in PCT Application No. PCT/JP2015/065475 including Corrected Version.

International Preliminary Report on Patentability dated Dec. 8, 2016 which issued in the counterpart Application No. PCT/JP2015/065475, including English translation.

* cited by examiner

CATALYST FOR INTERNAL COMBUSTION ENGINE EXHAUST GAS PURIFICATION, AND SYSTEM FOR SAME

TECHNICAL FIELD

The present invention relates to a catalyst for internal combustion engine exhaust gas purification, effective even with a small use amount of a noble metal, and an exhaust gas purification engine proximity type catalyst system using the catalyst.

BACKGROUND ART

As a method for purifying exhaust gas discharged from an internal combustion engine such as an automobile, a method using a monolithic (or honeycomb) support is generally used. This is obtained by applying a catalyst component on a monolithic structure as a molding member. The monolithic structure is obtained by rolling a molded article of a refractory inorganic oxide crystal such as cordierite or a metal thin plate, and has a flow path finely carved parallel to a gas flow direction. In a catalyst for internal combustion engine exhaust gas purification, in general, a wall surface of this flow path is thinly coated (support-coated) with a composition containing a catalyst active component, and a reaction of purifying exhaust gas passing at a high temperature proceeds.

As a catalyst for purifying exhaust gas from a gasoline automobile, a so-called three-way catalyst is used. This means a catalyst suitable for purifying exhaust gas generated by combustion with an engine approximately at a stoichiometric ratio. A stoichiometric ratio of a mixed gas formed of the air and a fuel is usually represented by an air-fuel ratio. The three-way catalyst contains rhodium, palladium, or platinum as a main active component, and was found about 35 years ago. Thereafter, technological development has been made by discovery of an oxygen storage material, improvement in a sensor technology, a processing speed of a computer, and engine controllability, improvement in a durability of a catalyst, or the like. In recent years, a technology has advanced to such a level that exhaust gas having a lower concentration than that of a hazardous substance contained in the air is discharged under normal driving conditions. Meanwhile, the three-way catalyst uses a noble metal or a rare earth element. Therefore, resource-saving and an economic efficiency due to reduction in a use amount thereof has become one of major objects.

Examples of technical problems related to emission reduction include measures on discharge of a hazardous substance by engine start-up. In vehicle test driving such as a FTP test in the United States, a discharge amount of a regulated substance such as a hydrocarbon (HC) or a nitrogen oxide (NOx) in this region occupies a large proportion in the whole test cycle. Therefore, reduction in a hazardous substance in a so-called cold staring region is effective as measures for emission reduction.

Reasons why a discharge amount is large at the time of engine start-up are that combustion of a fuel in an engine tends to be incomplete and a catalyst does not act. The temperature of a catalyst substance has not reached an acting temperature region due to a low temperature, and therefore a purification reaction does not proceed easily. In order to promote temperature rising of a catalyst body at the time of engine start-up, such a contrivance as described below to shorten time before activation of a catalyst has been made. That is, the temperature of exhaust gas is raised by adjusting a fuel injection amount or combustion timing in an engine, and a catalyst is disposed in a position proximate to an engine.

Therefore, an important function required for a proximity catalyst is early activation at the time of engine start-up, and therefore a proximate position is generally advantageous. However, for example, a catalyst is exposed to a high temperature including reaction heat in normal use after activation, or is poisoned by a sulfur (S) component or a phosphorus (P) component contained in a fuel or an engine oil. Therefore, a catalyst desirably has high durability.

In response to a growing concern about greenhouse gas, regulation on greenhouse gas has been strengthened.

This is so-called fuel economy regulation or $CO_2$ regulation. There is a trend to apply the regulation to greenhouse gas represented by nitrous oxide ($N_2O$). It is considered that exhaust gas in combustion in an engine contains substantially no nitrous oxide. However, nitrous oxide is formed/generated secondarily from NOx (NO and $NO_2$) which has passed through a monolithic catalyst. A mechanism of formation of nitrous oxide is described by such a reaction formula as follows. Here, exhaust gas hardly contains $NO_2$, and therefore a reaction formula with NO is described.

[Chemical Formula 1]

$2NO+CO \rightarrow N_2O+CO_2$ <span style="float:right;">reaction formula 1</span>

$2NO+H_2 \rightarrow N_2O+H_2O$ <span style="float:right;">reaction formula 2</span>

On a surface of a noble metal, as a reaction formula between adsorption species,

[Chemical Formula 2]

$NO(ad.) \rightarrow N(ad.)+O(ad.)$ <span style="float:right;">reaction formula 3</span>

$N(ad.)+NO(ad.) \rightarrow N_2O(ad.) \rightarrow N_2O$ <span style="float:right;">reaction formula 4</span> is considered. In the above formula, (ad.) indicates a reaction precursor adsorbed on a surface of metal. Therefore, considering the above reaction formulae 3 and 4, a generation mechanism of nitrous oxide can be understood.

[Chemical Formula 3]

$N_2O+H_2 \rightarrow N_2+H_2O$ <span style="float:right;">reaction formula 5</span>

$N_2O+CO \rightarrow N_2+CO_2$ <span style="float:right;">reaction formula 6</span>

In the above reaction formulae, reaction formulae 1 and 2 indicate reaction formulae by which $N_2O$ is formed from NO and CO or $H_2$. Reaction formulae 3 and 4 exemplify a reaction mechanism on a surface of a catalyst. It is known that a speed or a mechanism in these reactions depends on the kind of a catalyst element. In evaluation of light-off characteristics of a rhodium catalyst, a palladium catalyst, and a platinum catalyst, formation of nitrous oxide ($N_2O$) can be observed mainly at a low temperature (100 to 300° C.). Reaction formulae 5 and 6 indicate reaction formulae by which nitrous oxide formed is purified. Therefore, in order to suppress discharge of nitrous oxide, there are two technical problems of suppressing formation of nitrous oxide and purification thereof. A palladium catalyst produces nitrous oxide easily, and it is considered that this reaction proceeds by reaction formula 4 above or the like. There is little precedent related art regarding suppression of nitrous oxide within a range in which the inventors have studied in the present field. Patent Literatures 1 and 2 are related art for separating a catalyst into regions, but dispose palladium in an uppermost stream region, and therefore do not suppress discharge of nitrous oxide easily.

CITATION LIST

Patent Literatures

Patent Literature 1: JP 9-85091 A
Patent Literature 2: JP-2012-152702 A

SUMMARY OF INVENTION

Technical Problem

Therefore, the present invention has been accomplished in view of these circumstances, and provides an efficient catalyst for purifying exhaust gas, increasing an effective utilization ratio of a noble metal or a rare earth element and acting effectively even in a high temperature acting region from the time of cold starting while suppressing formation of nitrous oxide, and an engine proximity type catalyst system using the catalyst.

Solution to Problem

The above object is achieved by the following (1) to (15).

(1) An engine proximity type monolithic catalyst for internal combustion engine exhaust gas purification, having rhodium and palladium as noble metal catalyst active components sequentially supported on a monolithic support along a flow of the exhaust gas, including at least a first catalyst component region (a) having a catalyst active component layer which substantially contains only rhodium at a concentration of 0.1 to 3.0 g/L at a length of 3 to 30 mm on an upstream side, and a second catalyst component region (b) having a catalyst active component layer containing palladium at a concentration of 1.0 to 20.0 g/L at a length of 10 to 100 mm.

(2) The catalyst according to the above (1), further including a third catalyst component region (c) having a catalyst component containing rhodium at a concentration of 0.05 to 1.0 g/L and an oxygen storage material at a concentration of 30 to 150 g/L at a length of 25 to 150 mm disposed on a monolithic support in a downstream region of the first catalyst component region (a) and the second catalyst component region (b).

(3) The catalyst according to the above (1) or (2), in which the first catalyst component region (a) contains an oxygen storage material at 20 g/L or less.

(4) The catalyst according to any one of the above (1) to (3), in which the catalyst components are blended with a refractory inorganic oxide.

(5) The catalyst according to any one of the above (1) to (4), in which the concentration of rhodium in the first catalyst component region (a) is from 0.2 to 1.5 g/L, the length thereof is from 5 to 25 mm, the concentration of palladium in the second catalyst component region (b) is from 2.0 to 10.0 g/L, and the length thereof is from 20 to 60 mm.

(6) The catalyst according to the above (2), in which the concentration of rhodium in the third catalyst component region (c) is from 0.1 to 0.5 g/L, and the concentration of an oxygen absorption material is from 50 to 120 g/L, and the length thereof is from 30 to 100 mm.

(7) The catalyst according to any one of the above (1) to (6), in which the second catalyst component region (b) contains at least one alkaline earth metal element.

(8) The catalyst according to the above (7), in which the alkaline earth metal element is strontium and/or barium, and the catalyst contains the element at 1.0 to 15.0 g/L in terms of an oxide thereof.

(9) The catalyst according to any one of the above (1) to (8), in which a blending amount of a catalyst composition as a noble metal catalyst active component with respect to a catalyst composition in the first catalyst component region (a) is from 0.037 to 6.0% by mass, and a blending amount of a catalyst component as a noble metal catalyst active component with respect to a catalyst composition in the second catalyst component region (b) is from 0.37 to 40.0% by mass.

(10) The catalyst according to any one of the above (2) to (9), in which the concentration of the oxygen storage material in the third catalyst component region (c) is form 10.0 to 80% by mass.

(11) The catalyst according to anyone of the above (2) to (10), in which the oxygen storage material is at least one selected from the group consisting of ceria, zirconia, a solid solution or a composite oxide of cerium-zirconium, a cerium-zirconium-alumina composite oxide, and an oxide obtained by adding a rare earth element at 0 to 40% by mass as an additive thereto.

(12) The catalyst according to anyone of the above (1) to (11), in which the first catalyst component region (a) and the second catalyst component region (b) are formed on an integrated monolithic support.

(13) The catalyst according to anyone of the above (1) to (12), in which the first catalyst component region (a) and the second catalyst component region (b) are formed on separated monolithic supports.

(14) A system for purifying internal combustion engine exhaust gas using the catalyst according to any one of the above (1) to (13), in which a reaching temperature in a position of upstream 1 cm in the first catalyst component region is 300° C. or higher in initial 20 seconds at the time of cold starting at 15° C. to 30° C.

(15) A system for purifying internal combustion engine exhaust gas using the catalyst according to any one of the above (1) to (13), in which a reaching temperature in a position of upstream 1 cm in the first catalyst component region is 350° C. or higher in initial 20 seconds at the time of cold starting at 15° C. to 30° C.

Effect of the Invention

A catalyst for internal combustion engine exhaust gas purification and a catalyst system thereof according to the present invention are formed of a catalyst with which a catalyst structure represented by monolith is support-coated, and include a first catalyst region (a) mainly containing rhodium, a second catalyst region (b) mainly containing palladium, and a third catalyst region (c) mainly containing rhodium and an oxygen storage material, if necessary, sequentially from an upstream of the exhaust gas. As a monolithic structure, a structure made of cordierite, silicon carbide, or metal can be used.

Such a catalyst and catalyst system can act effectively for purifying exhaust gas from the time of cold starting, and can suppress formation of not only HC, CO, and NOx but also $N_2O$ and perform purification thereof at the time of discharge.

The first catalyst region (a) and the second catalyst region (b) at an upstream exhibit a complementary effect by being disposed in this order. As for purification of NOx, first disposition of rhodium suppresses formation of $N_2O$, and the palladium region (b) sequentially activated enhances a purification efficiency of HC, for example, combustion of a flame retardant hydrocarbon. The layer containing rhodium and an oxygen storage, disposed on a downmost stream, if necessary, further enhances a purification efficiency as a whole of the catalyst system, for example, by promoting a shift reaction or a reforming reaction while absorbing variation of a stoichiometric ratio due to control of an automobile.

By disposing such a catalyst system in a position proximate to an engine, an exhaust gas purification reaction is promoted effectively from the time of cold starting, and performance equal to or higher than a structure obtained by disposing a two-layer catalyst having a homogeneous coating formed of rhodium and palladium or palladium at a high concentration in an uppermost stream position proximate to an engine, is obtained with a small amount of a noble metal.

MODES FOR CARRYING OUT THE INVENTION

Figure 1:
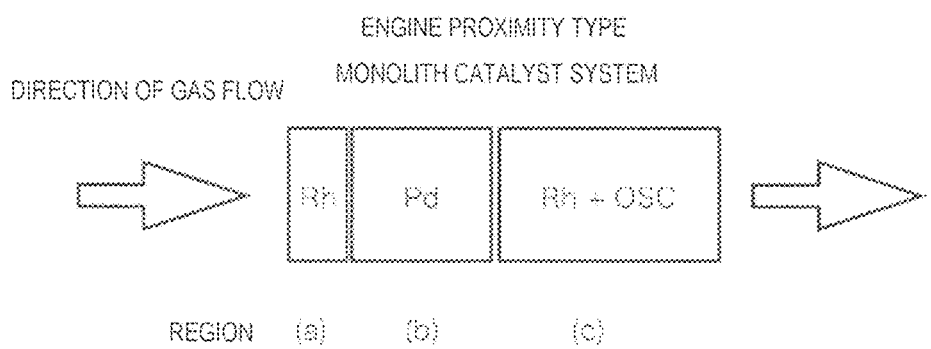
FIG. 1 is a schematic diagram of a typical catalyst system according to the present invention.

A monolithic support (three-dimensional structure) used in the present invention is not particularly limited, and a monolithic support generally used in a field of a catalyst for exhaust gas purification can be used appropriately. However, a three-dimensional integrated structure formed of a monolithic support (refractory material) can be preferably used. Particularly, a three-dimensional integrated structure using a honeycomb support formed of cordierite or a heat-resistant metal is suitable.

The region (a) of palladium requires the above containing only rhodium as the first catalyst component region and the region (b) as the second catalyst component region in the above (1) are characterized by a content of a noble metal and a length, and are characterized in that the length from an inlet of a support region only containing rhodium is from 3 to 30 mm, preferably from 5 to 25 mm, and the support amount is from 0.1 to 3.0 g/L, preferably from 0.2 to 1.5 g/L. It is characterized in that the length of palladium in the region (b) is from 10 to 100 mm, preferably from 15 to 60 mm, and the support amount thereof is from 1.0 to 20.0 g/L, preferably from 2.0 to 10.0 g/L. This region (a) of rhodium requires the above length, but a small part of the rhodium layer may be disposed in the region (b) of palladium disposed contiguously thereto so as to overlap the region (b).

In the above (1), the monolithic structure is formed integrally or separately. Structures having different characteristics, for example, in which a cell density (the number of cells/square inch) of a first structure is 900, a cell density of a second structure is 600, and a difference in a wall thicknesses is provided, may be used. Alternatively, a structure having the same characteristics may be used. When a geometric surface area in a cell is changed by these changes, a gas linear velocity, diffusibility of gas to a catalyst coating layer, temperature rising characteristics of a structure, and the like are changed, and therefore a more appropriate purification efficiency may be obtained. Therefore, a user can make appropriate selection. By a cell density of 600 cells or more, preferable performance is obtained easily.

In the invention of the above (2), a structure of the third catalyst component region (c) following the above (1) is specified, and essentially contains rhodium and an oxygen occlusion material. In the region (c), the temperature is low immediately after cold starting, and therefore a catalyst hardly acts. The temperature of the region (c) usually reaches a temperature for activation in about 30 to 60 seconds after starting. However, a purification reaction proceeds in the region (a) and the region (b), and therefore the gas concentration in an inlet of the region (c) is at a sufficient low level. Therefore, the region (c) does not necessarily require a higher concentration (g/L) of a noble metal than the region (a) or the region (b). In a case of a combustion gas at a stoichiometric ratio or less, a combustion reaction proceeds primarily by oxygen in the region (a) and the region (b), and the concentration of oxygen is sufficiently low in the inlet of the region (c). Therefore, in the region (c), a catalyst for promoting a purification reaction by an aqueous gas shift reaction which easily proceeds in a reducing atmosphere or a reforming reaction of HC is effective, and rhodium which is highly active to these reactions is used. In a case of a combustion gas at a stoichiometric ratio or more, oxygen at a high concentration flows also into the region (c). However, by using an oxygen storage material, oxygen can be absorbed, and a combustion reaction can proceed by releasing oxygen when a combustion gas condition changes to a stoichiometric ratio or less.

Therefore, the region (c) imparts a function to promote a combustion reaction by disposing rhodium easily causing an aqueous gas shift reaction or a reforming reaction and supplying oxygen with an oxygen storage material. The shift reaction and the reforming reaction are relatively slow reactions, and therefore are particularly advantageous when a monolithic structure has a large geometric surface area. Therefore, it is effective to make the length of the region (c) longer than that of the region (a) or (b) in order to further reduce emission.

A function is sufficiently exhibited when the concentration of rhodium in the region (c) is typically equal to or lower than that in the region (a), preferably ½ or less of that in the region (a). The length of the region (c) is typically from 25 to 150 mm, preferably from 30 to 100 mm. A reason why the range is large is that a space in which a catalyst is disposed in a position proximate to an engine is limited in many cases and there is a large difference between vehicles. By containing an oxygen storage material at 30 to 150 g/L, preferably at 40 to 120 g/L as a use amount thereof, a transient response of catalyst performance is improved while the amount of a noble metal used is reduced.

(Noble Metal)

In the present invention, as a starting raw material of palladium as a noble metal active component, a raw material used in a field of purifying exhaust gas can be used without any particular limitation. Specific examples thereof include a halide, an inorganic salt, a carboxylate, a hydroxide, an alkoxide, and an oxide. Preferable examples thereof include a nitrate, an acetate, an ammonium salt, an amine salt, a tetraamine salt, and a carbonate. Among these compounds, a nitrate, a chloride, an acetate, and a tetraamine salt are preferable, and palladium nitrate is more preferable. The palladium sources may be used singly or in combination of two or more kinds thereof.

In the present invention, as a starting raw material of rhodium as a noble metal active component, a raw material used in a field of purifying exhaust gas can be used without any particular limitation. Specific examples thereof include a halide, an inorganic salt, a carboxylate, a hydroxide, an alkoxide, and an oxide. Preferable examples thereof include a nitrate, an ammonium salt, an amine salt, and a carbonate. Among these compounds, a nitrate, a chloride, an acetate, and a hexaamine salt are preferable, and rhodium nitrate is more preferable. The rhodium sources may be used singly or in combination of two or more kinds thereof.

A support form of a noble metal is not particularly limited, but the noble metal is preferably supported on a refractory inorganic oxide or an oxygen storage material described below.

A method for making a noble metal supported on a refractory inorganic oxide or an oxygen storage material is not particularly limited, and a support method used in the present technical field can be used appropriately. Specific examples thereof include (1) a method for mixing a refractory inorganic oxide or an oxygen storage material with a noble metal aqueous solution, and drying and calcining the resulting mixture; (2) a method for mixing a refractory inorganic oxide or an oxygen storage material with a noble metal aqueous solution, then reducing a noble metal ion by adding a reducing agent to precipitate the noble metal, and attaching the noble metal to the refractory inorganic oxide or the oxygen storage material; and (3) a method for mixing a refractory inorganic oxide or an oxygen storage material with a noble metal aqueous solution, then heating the resulting mixture, and making the noble metal adsorbed by the refractory inorganic oxide or the oxygen storage material.

(Oxygen Storage Material)

The catalyst of the present invention can contain an oxygen storage material as a catalyst component according to description in the above (1) and (2). Examples of an inorganic oxide used as an addition form of an oxygen storage material include cerium oxide ($CeO_2$), a ceria-zirconia composite oxide ($CeO_2$—$ZrO_2$), and a composite oxide of these oxides and alumina. These oxides are used as an additive to a catalyst composition or a support substrate for a noble metal.

The inorganic oxide used as an oxygen storage material preferably contains a rare earth metal (excluding ceria) at 0 to 40% by mass. Such an effect that oxygen diffusibility or a heat-resistant characteristic is improved is thereby obtained. This rare earth metal added may be in a form of an element of a solid solution or a composite of an oxygen storage material. Examples of the rare earth metal include metals similar to rare earth elements which can be contained in the above refractory inorganic oxide. Among these metals, lanthanum, neodymium, yttrium, and praseodymium are preferable, and lanthanum and yttrium are more preferable. A specific surface area thereof is desirably 30 $m^2/g$ or more, more desirably 40 $m^2/g$ or more after calcining at 900° C. for three hours in the air by a BET method.

(Additive)

The catalyst of the present invention may contain an additive effective for improving heat-resistance of a refractory inorganic oxide, heat-resistance of a noble metal, or the like in addition to the noble metal, the oxygen storage material, and the refractory inorganic oxide as a catalyst component. The additive is not particularly limited, but a palladium-containing catalyst composition preferably contains an alkaline earth metal element. Examples of the alkaline earth metal include strontium and barium. As starting raw materials of these additives, an oxide, a hydroxide, an acetate, a sulfate, or the like can be used regardless of being water-soluble or water-insoluble.

The content of the additive is not particularly limited, but is usually from 0 to 50 g/L, preferably from 0.1 to 20 g/L in terms of an oxide thereof per L of a catalyst, A rare earth element such as lanthanum, praseodymium, or neodymium can be added for stability of a noble metal or an oxide. A sol may be added, for example, in order to control stability of a noble metal and a distribution of pores. Typical examples thereof include sol of alumina and zirconia, and a commercially available product can be used.

(Refractory Inorganic Oxide)

The catalyst component of the present invention preferably contains at least one refractory inorganic oxide. Fine particles of the noble metal or the like are supported on a surface of a refractory inorganic oxide. A surface area of the noble metal can be thereby secured, and performance as a catalyst can be exhibited effectively. The refractory inorganic oxide used in the present invention is not particularly limited, and a refractory inorganic oxide used in the present technical field can be used appropriately. Examples thereof include refractory alumina represented by γ-alumina or θ-alumina, a single oxide such as titania ($TiO_2$), zirconia ($ZrO_2$), lanthana ($La_2O_3$), or silica ($SiO_2$), and a composite oxide thereof such as an alumina-titania, alumina-zirconia, alumina-lanthana, titania-zirconia, zeolite (aluminosilicate), silica-alumina, or alumina-oxygen storage material composite oxide. A single oxide such as γ-alumina, titania, zirconia, lanthana, or silica, and a composite oxide thereof are preferably used. A refractory inorganic oxide in which some of metal elements are stabilized by a rare earth element may be used, or a composite oxide may be formed with ceria or zirconia. Particularly in a case of the refractory alumina, the refractory alumina preferably contains an element selected from lanthanum, zirconium, cerium, praseodymium, and neodymium at 0.1 to 10% by mass. This brings about an effect of improving heat-resistance, or the like. The above refractory inorganic oxides may be used singly or in a form of a mixture of two or more kinds thereof.

A BET specific surface area of the refractory inorganic oxide is not particularly limited, but is preferably from 1 to 750 $m^2/g$, more preferably from 10 to 200 $m^2/g$ after calcining at 900° C. for three hours in the air. By using such a refractory inorganic oxide, a catalyst component (for example, a noble metal) can be supported sufficiently.

(Catalyst Composition)

A catalyst composition used in the present invention contains a noble metal and a refractory oxide, and an additive and an oxygen storage material used, if necessary, described above. A noble metal is fixed (supported) on a refractory oxide or an oxygen storage material added, if necessary. An additive and a noble metal may form a composite.

A three-dimensional structure is thinly coated with the catalyst composition, and the resulting product serves as a catalyst body.

Composition masses in the region (a), the region (b), and the region (c) are from 50 to 270 g/L, from 50 to 270 g/L, and from 100 to 300 g/L, respectively, and are preferably from 70 to 250 g/L, from 70 to 250 g/L, and from 120 to 270 g/L, respectively, when being defined as per an apparent volume (L) (liter) of a three-dimensional structure. The Composition masses are more preferably from 70 to 250 g/L, from 70 to 250 g/L, and from 120 to 270 g/L, respectively. Therefore, the concentration of rhodium used in the region (a) is from 0.037 to 6.0% by mass, the concentration of palladium used in the region (b) is from 0.37 to 40.0% by mass, the concentration of rhodium used in the region (c) is from 0.017 to 1.0% by mass, and the concentration of an oxygen storage material used in the region (c) is from 10.0 to 80.0% by mass. A catalyst composition can be selected appropriately within the above range considering heat capacity of a catalyst structure, pressure loss thereof, and durability thereof.

(Three-Dimensional Structure)

A three-dimensional structure (monolithic support) used for the catalyst of the present invention is not particularly limited, and a three-dimensional structure usually used in the present field can be used without any limitation. Examples of the three-dimensional structure include a heat-resistant support such as a honeycomb support. An integrated honeycomb structure is preferable, and examples thereof include a monolithic honeycomb support, a metal honeycomb support, and a plug honeycomb support. Examples of a not-integrated three-dimensional structure include a pellet support.

The monolithic honeycomb support is usually only required to be a so-called ceramic honeycomb support. Particularly, a honeycomb support formed of cordierite, silicon carbide, mullite, α-alumina, zirconia, titania, titanium phosphate, aluminum titanate, petalite, spodumene, alumino silicate, magnesium silicate, or the like is preferable. Among these supports, a support formed of cordierite is particularly preferable. In addition, an integrated structure formed using a heat-resistant and oxidation-resistant metal, such as stainless steel or a Fe—Cr—Al alloy, is used. These monolithic supports are manufactured by an extrusion molding method or a method for winding and solidifying a sheet-like element. The shape of a gas passage opening (cell shape) may be hexagonal, quadrangular, triangular, or corrugated. A support having a cell density (the number of cells/unit cross-sectional area) of 100 to 1200 cells/square inch can be used sufficiently. The cell density is preferably from 400 to 900 cells/square inch. The cell density is more preferably from 600 to 900 cells/square inch. Use of a support having a high cell density increases a geometric surface area, and makes a catalyst available more effectively, for example. A cell wall having a higher porosity makes a specific heat per unit volume lower, and may be effective for temperature rising characteristics of a catalyst body. The value is only required to be from 20% to 70%. A cell wall having a smaller thickness makes a pressure loss smaller, or makes a specific heat lower effectively, for example. The thickness is preferably from 1.0 to 6.0 milli-inches, more preferably from 1.5 to 5.0 milli-inches.

(Method for Manufacturing Catalyst for Internal Combustion Engine Exhaust Gas Purification)

A method for manufacturing the catalyst for internal combustion engine exhaust gas purification of the present invention is not particularly limited, and a known method can be referred to appropriately as long as the method includes making the catalyst component supported. Specifically, the catalyst can be manufactured by the following method.

(1) A method for adding an oxygen storage material, an additive component, a noble metal salt, and a refractory inorganic oxide to a solvent, then forming the resulting mixture into a slurry using a wet pulverizer such as a ball mill, immersing a three-dimensional structure in the slurry, removing the excess slurry, and drying and calcining the resulting product to obtain a catalyst; (2) a method for adding an oxygen storage material, an additive component, and a refractory inorganic oxide having a noble metal supported to a solvent, then forming the resulting mixture into a slurry using a wet pulverizer such as a ball mill, immersing a three-dimensional structure in the slurry, removing the excess slurry, and drying and calcining the resulting product to obtain a catalyst; (3) a method for adding an additive component and a refractory inorganic oxide having a noble metal supported to a solvent, then forming the resulting mixture into a slurry using a wet pulverizer such as a ball mill, immersing a three-dimensional structure in the slurry, removing the excess slurry, and drying and calcining the resulting product to obtain a catalyst; (4) a method for adding an oxygen storage material and a refractory inorganic oxide to a solvent, then forming the resulting mixture into a slurry using a wet pulverizer such as a ball mill, immersing a three-dimensional structure in the slurry, removing the excess slurry, drying or calcining the resulting product, then immersing the resulting product in an aqueous solution containing a water-soluble salt of a noble metal and a water-soluble salt of an additive component, then removing the excess solution, and drying and calcining the resulting product to obtain a catalyst; and (5) a method for adding an oxygen storage material, an additive component, and a refractory inorganic oxide to a solvent, then forming the resulting mixture into a slurry using a wet pulverizer such as a ball mill, immersing a three-dimensional structure in the slurry, removing the excess slurry, drying or calcining the resulting product, then immersing the resulting product in an aqueous solution containing a noble metal salt, removing the excess solution, and drying and calcining the resulting product to obtain a catalyst.

A method for manufacturing a catalyst having two or more catalyst layers formed is not particularly limited, and a conventionally known method can be referred to appropriately as long as the method includes a step for forming the first catalyst layer on the three-dimensional structure and a step for forming the second catalyst layer on the first catalyst layer. Specifically, a completed catalyst can be manufactured by forming a catalyst layer of a lower layer (first layer) according to the above (1) to (4), then repeating the operations in (1) to (4) appropriately, and forming a catalyst layer of the second or higher layer.

In the above method, a solvent used for preparing a slurry is not particularly limited, and a solvent used in the present technical field can be used appropriately. In this case, the concentration of a catalyst component in a solvent is not particularly limited as long as a desired amount thereof can be supported on a three-dimensional structure. The concentration of a catalyst component in a solvent is preferably from 20 to 60% by mass, more preferably from 25 to 50% by mass. After a catalyst active component is mixed with a solvent, the resulting mixture is preferably subjected to wet pulverization. In this case, a method of wet pulverization is usually a known method, and is not particularly limited. For example, wet pulverization is performed using a ball mill. Conditions of drying and calcining after a three-dimensional structure is coated with a catalyst component are not particularly limited, and conditions used in the present technical field can be used appropriately.

There are various methods for making a catalyst component supported on a three-dimensional structure. Examples thereof include the following, but any adjustment method can be used as long as being effective.

(A) A three-dimensional structure having a predetermined length, such as a honeycomb, is immersed in a slurry containing a catalyst component, and is pulled up. Then, the excess slurry is removed, and the resulting product is dried, calcined, and cut to complete a catalyst component region as an object. When multilayer coating is performed, a product obtained by performing drying, calcining, and the like appropriately and repeating a coating operation is only required to be cut.

(B) A three-dimensional structure was immersed in a catalyst composition slurry containing rhodium, was dried and calcined. Subsequently, the three-dimensional structure was immersed in a catalyst composition slurry containing palladium from the other end thereof, and was dried and calcined to obtain a catalyst.

(C) A support other than the catalyst obtained in (B) was immersed in a slurry containing rhodium and ceria, was dried and calcined. This operation was repeated so as to obtain a predetermined coating amount to obtain a catalyst.

In an integrated catalyst containing the regions (a) and (b), a region on which a catalyst component is not supported may be present between a rhodium support region on an upstream side and a palladium region on a downstream side, or an overlapping portion may be present partially. In the former case, a purification efficiency may be enhanced by an effect of a gas flow or the like. In the latter case, ignition characteristics or the like may be improved. For example, the length of the region in the former case is from 1 to 5 mm, and the length of the region in the latter case is from 1 to 30 mm.

Purification characteristics of an engine proximity type monolithic catalyst system at the time of cold starting in the present invention have a close relation to a temperature rising curve or, more precisely, an energy flux per unit time to a catalyst inlet. Main factors related to temperature rising of a catalyst structure are a gas flow rate, a temperature rising rate, a temperature difference between a gas and a structure, a heat transfer rate, a heat conduction rate, and a heat capacity of a catalyst. By initiation of a purification reaction, a reaction heat is added thereto. In general, individual characteristics of a vehicle are involved in these characteristics. Examples thereof include an element such as an exhaust gas amount, a horsepower, or engine combustion timing, and a position in which a catalyst is disposed. It is difficult to uniquely define an optimal length of a catalyst region because these factors are involved therein closely. However, it may be possible to find an optimal length distribution within a range of the above (1) and/or the above (2). Even in vehicles with the same exhaust gas characteristics, a gas linear velocity (m/s) or a heat capacity per unit length of a monolithic structure is changed according to a cross-sectional area of the structure. Therefore, it is necessary to adjust a support coating length according to this change. In a temperature rising curve at the time of cold starting, a reaching temperature in a position of upstream 1 cm in the first catalyst component region is preferably 300° C. or higher, more preferably 350° C. or higher, still more preferably 400° C. or higher in initial 20 seconds at the time of cold starting at 15° C. to 30° C.

Typical examples of a content of a noble metal will be illustrated. This is a case where a catalyst system for a gasoline engine vehicle having an exhaust gas amount of about 1.0 L to 2.0 L is assumed. A monolithic structure having a total volume of 785 cc (cross-sectional area: 78.5 cm$^2$), a length of the region (a) of 15 mm, a length of the region (b) of 30 mm, a length of the region (c) of 55 mm, a concentration of rhodium in the region (a) of 0.4 g/L, a concentration of palladium in the region (b) of 6.0 g/L, and a concentration of rhodium in the region (c) of 0.15 g/L can be exemplified. That is, the region (a) contains 0.047 g of rhodium, the region (b) contains 1.41 g of palladium, and the region (c) contains 0.065 g of rhodium. In addition, the region (c) further contains an oxygen storage material at 100 g/L, that is, 43 g thereof. As another example, when a case where the exhaust gas amount is larger is assumed, a monolithic structure having a total volume of 1470 cc (cross-sectional area: 113.04 cm$^2$), a length of the region (a) of 15 mm, a length of the region (b) of 50 mm, a length of the region (c) of 68 mm, a concentration of rhodium in the region (a) of 1.0 g/L, a concentration of palladium in the region (b) of 10.0 g/L, and a concentration of rhodium in the region (c) of 0.3 g/L can be exemplified. That is, the region (a) contains 0.17 g of rhodium, the region (b) contains 5.65 g of palladium, and the region (c) contains 0.23 g of rhodium. In addition, the region (c) further contains an oxygen storage material at 120 g/L, that is, 92.2 g thereof.

The present invention will be described in more detail by using Examples and Comparative Examples below.

(Performance Test)

Figure 13A:
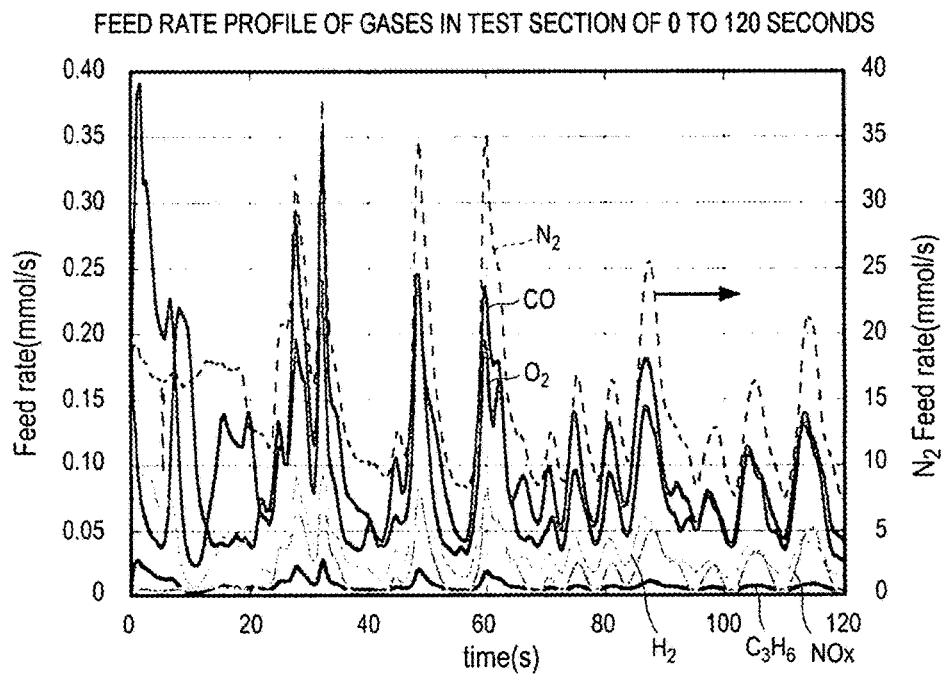
FIG. 13A is a graph illustrating a feed rate of a raw material gas applied to emission measurement. The raw material feed rate profile indicates a case of O100-F100.
Figure 13B:
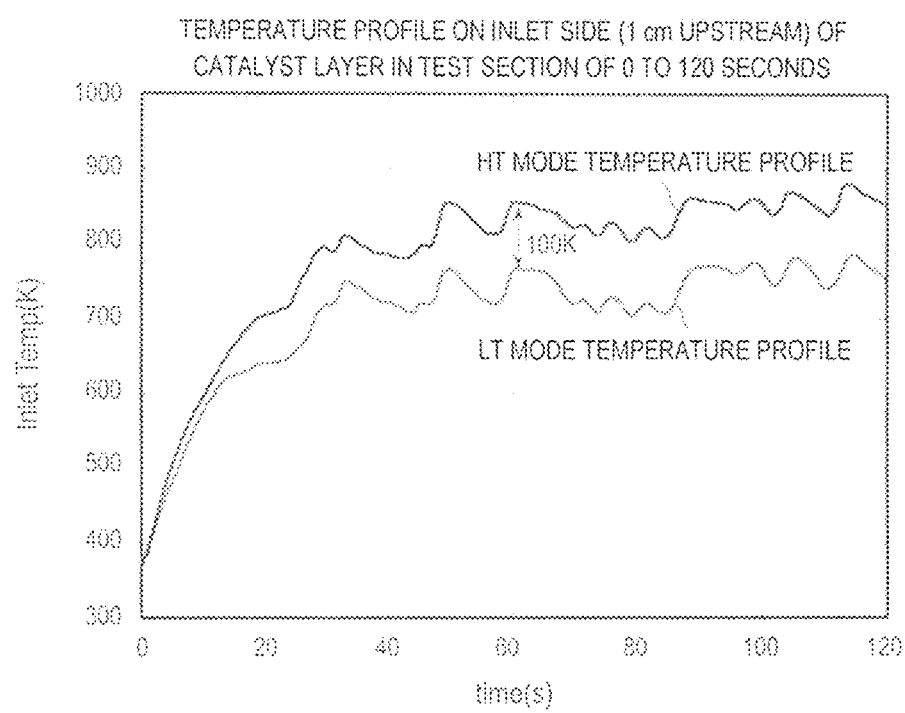
FIG. 13B is a graph illustrating a temperature profile applied to emission measurement. The temperature profile indicates cases of LT and HT.

As a catalyst performance test, a test using a synthetic gas test apparatus was performed. A test method simulates a FTP test which is a regulated mode test in the United States. FIGS. 13A and 13B illustrate test profiles.

Table 1 shows a test pattern when a concentration of an introduction gas, a gas temperature, and a gas flow rate were changed based on the profiles in FIGS. 13A and 13B. Table 1 shows the concentration of an introduction gas, a gas temperature, and a gas flow rate. In the following Examples and Comparative Examples, an emission integrated value for two minutes after initiation of a test is separated into sections of 0 to 60 seconds and 60 to 120 seconds. A test result is expressed by a mass (g) of a discharge amount (emission integrated value). The emission integrated value was determined by the following calculation method.

Calculation of Emission Integrated Value

CO is used an example.

[Numerical formula 1]

$$\text{emission integrated value (g)} = \frac{\sum \text{total value} \left(\frac{L}{S}\right) \text{ of instantaneous flow rate under standard condition (25° C.)} \times \text{instantaneous gas concentration (\%)} \times \text{sampling time (s)}}{\left(22.4 \text{ (L/mol)} \times \frac{298}{273} \times \text{CO molecular weight (g/mol)}\right)}$$

A data sampling interval was 10 ms. Σ represents a sum in an integration section.

In an emission measurement experiment, measurement was performed under various conditions in order to define the scope of the present invention while assuming application to various vehicles. As a temperature profile, two kinds of temperature profiles, LT and HT patterns were used. In order to examine an effect of stoichiometry, three types of concentration profiles O90, O100, and O110 patterns were used according to a concentration of oxygen. In order to examine an effect of a flow rate or a linear velocity, four flow rate profiles F75, F100, F125, and F150 were used.

TABLE 1 test pattern

| name | temperature profile | oxygen concentration profile | flow rate profile |
|---|---|---|---|
| LT | standard | — | — |
| HT | high temperature | — | — |
| O90 | — | standard value − 10% | — |
| O100 | — | standard | — |
| O110 | — | standard value + 10% | — |
| F75 | — | — | standard value − 25% |
| F100 | — | — | standard |
| F125 | — | — | standard value + 25% |
| F150 | — | — | standard value + 50% |

For example, a test LT-O110-F125 means that a test profile depending on time at a standard temperature at a standard value of a concentration of oxygen+10% at a flow rate+25% has been applied.

Example 1

A catalyst slurry containing rhodium at 0.705 g/L, 2% lanthanum-containing γ-$Al_2O_3$ at 140 g/L, 10% yttrium-containing $ZrO_2$ at 30 g/L, and barium in terms of BaO at 0.5 g/L was prepared. A 1.0 L (liter) cordierite monolithic structure having a cell density of 600 cells and a wall thickness of 4 milli (milli-inches) was support-coated with the catalyst slurry. As for the content of the catalyst component, the content of rhodium was 0.705 g/L, the content of lanthanum-containing alumina was 140 g/L, the content of 10% yttrium-containing $ZrO_2$ was 30 g/L, and the content of barium in terms of BaO was 0.5 g/L. This is referred to as catalyst 1A. A catalyst slurry containing palladium at 4.70 g/L, 2% lanthanum and 2% praseodymium-containing γ-$Al_2O_3$ at 70 g/L, and barium in terms of BaO at 10.0 g/L was prepared. A 1.0 L cordierite monolithic structure having a cell density of 600 cells and a wall thickness of 4 milli (milli-inches) was support-coated with the catalyst slurry. The catalyst which had been subjected to support-coating contained palladium at 4.70 g/L, lanthanum and praseodymium-containing alumina at 70 g/L, and Ba in terms of BaO at 10.0 g/L. This is referred to as catalyst 1B.

Each of catalysts 1A and 1B was dried at 120° C. for 15 minutes, and then was calcined at 500° C. in the presence of the air for one hour. Thereafter, each of catalysts 1A and 1B was subjected to a thermal deterioration resistance treatment in a stream of nitrogen containing 10% moisture at 1000° C. Catalyst 1A was cut into a size of Φ20×5 mm. Catalyst 1B was cut into a size of Φ20×15 mm. Catalysts 1A and 1B are referred to as catalyst 1A-1000-5 and catalyst 1B-1000-15, respectively. These catalysts were incorporated into a test apparatus to measure emission. The catalysts were connected to each other in series. 1A-1000-5 was disposed on an upstream side, and 1B-1000-15 was disposed on a downstream side.

Comparative Example 1

The same catalysts as in Example 1 were incorporated into a test apparatus to measure emission. Here, 1B-1000-15 was disposed on an upstream side, and 1A-1000-5 was disposed on a downstream side.

Comparative Example 2

A two-layer support-coating catalyst was prepared on a 1.0 L cordierite monolithic structure having a cell density of 600 cells and a wall thickness of 4 milli (milli-inches). A catalyst slurry containing rhodium at 0.235 g/L, 2% La-containing γ-$Al_2O_3$ at 140 g/L, 10% Y-containing $ZrO_2$ at 30 g/L, and Ba in terms of BaO at 0.5 g/L was prepared. A lower layer was support-coated with the palladium-containing slurry used in Example 1 in the same amount as in Example 1, and the resulting product was dried and calcined under the same conditions. An upper layer was support-coated with the rhodium-containing slurry prepared in the present Example so as to include rhodium at 0.235 g/L, and the resulting product was dried and calcined under the same conditions as in Example 1. This is referred to as catalyst 2C. Catalyst 2C was subjected to a thermal deterioration resistance treatment under the same conditions as in Example 1. This catalyst was cut into a size of Φ20×15 mm. The mass of a catalyst component included in the catalyst having a size of Φ20×15 mm, prepared in this way, was the same as that in Example 1 or Comparative Example 1. The catalyst obtained in this way is referred to as 2C-1000-15. Catalyst 2C-1000-15 was incorporated into a test apparatus to measure emission.

Comparative Example 3

Catalyst C after a heat resistance treatment, obtained in Comparative Example 2, was cut into a size of Φ20×30 mm. The catalyst obtained in this way is referred to as 2C-1000-30. The amount of rhodium and palladium contained in this catalyst corresponds to twice the amount thereof in each of Example 1 and Comparative Examples 1 and 2. Catalyst 2C-1000-30 was incorporated into a test apparatus to measure emission.

Figure 2A:
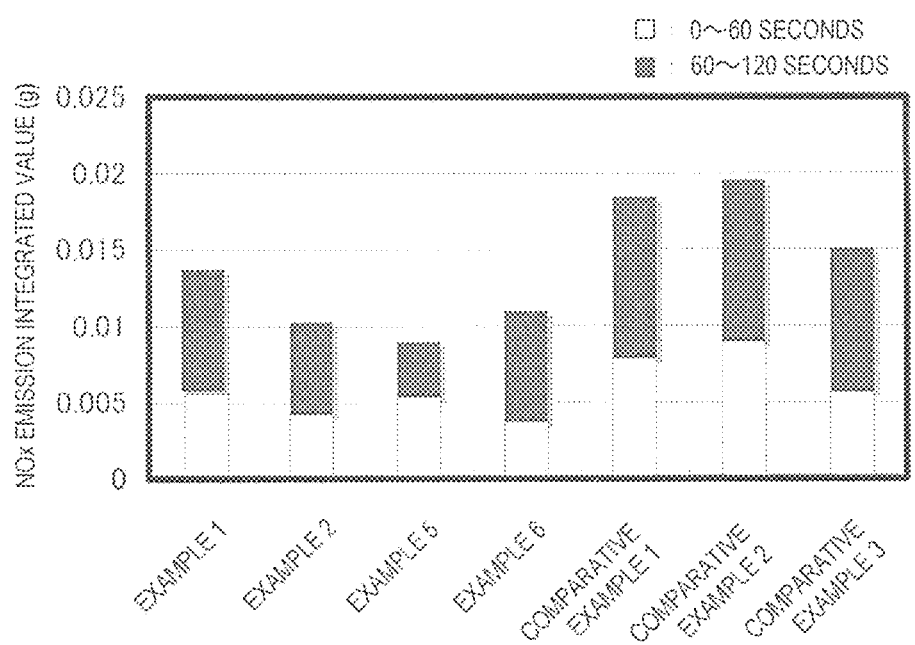
FIG. 2A is a graph indicating NOx emission integrated values in Examples 1, 2, 5, and 6 and Comparative Examples 1, 2 and 3. A test mode LT-O100-F100 was used. These are results in a test section of 0 to 120 seconds.
Figure 2B:
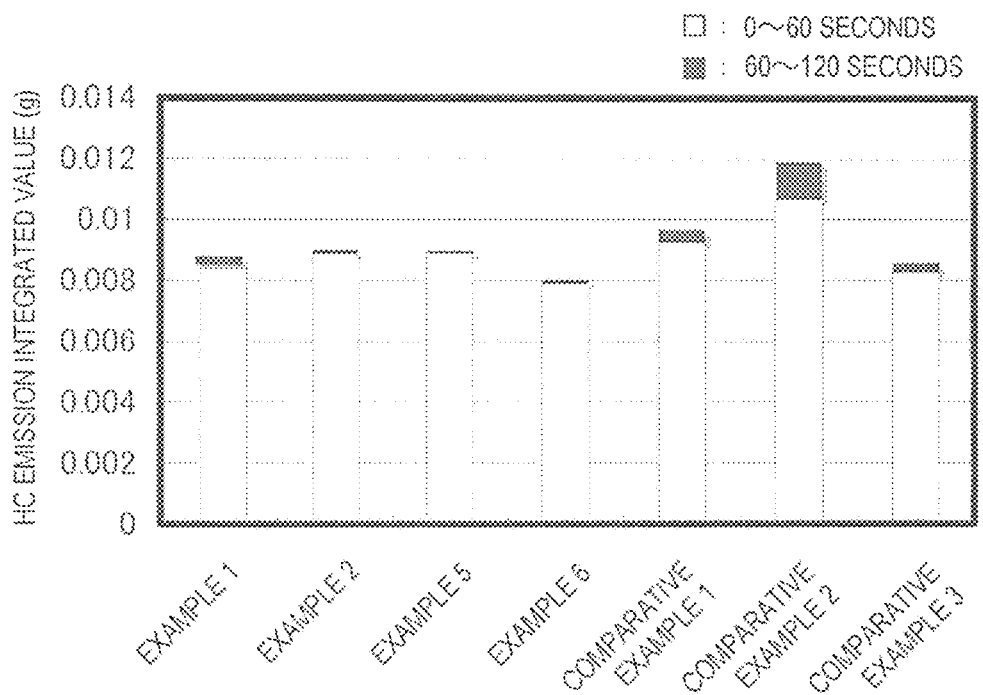
FIG. 2B is a graph indicating HC emission integrated values in Examples 1, 2, 5, and 6 and Comparative Examples 1, 2 and 3. The test mode and the test section are similar to those in FIG. 2A.

Results in Example 1 and Comparative Examples 1 to 3 are illustrated collectively in FIGS. 2A and 2B.

In Example 1 and Comparative Example 1, as an emission integrated value for 120 seconds, reduction of about 15 to 20% in NOx, reduction of about 70% in $N_2O$, and reduction of 5 to 10% in HC are recognized at any temperature profile. In Comparative Examples 2 and 3, performance of a two-layer catalyst was measured, and a $N_2O$ value is lower than that in Comparative Example 1, but is about twice that in Example 1. In Comparative Example 3 in which the length of a catalyst is twice that in Comparative Example 2, HC and NOx are reduced, but an emission value of $N_2O$ is hardly changed. In these catalyst systems, it has been revealed that Examples and Comparative Examples other than Comparative Example 3 have test results at the same amount of a noble metal and have purification characteristics equal to or higher than Comparative Example 3 with a noble metal in an amount smaller than Comparative Example 3. The present invention suppresses discharge of $N_2O$ significantly.

Example 2

A catalyst slurry containing rhodium at 0.235 g/L, 2% lanthanum-containing γ-Al$_2$O$_3$ at 140 g/L, 10% yttrium-containing ZrO$_2$ at 30 g/L, and barium in terms of BaO at 0.5 g/L was prepared. A 1 L cordierite monolithic structure having a cell density of 600 cells and a wall thickness of 4 milli (milli-inches) was support-coated with the catalyst slurry. As for the content of the catalyst component, the content of rhodium was 0.235 g/L, the content of lanthanum-containing alumina was 140 g/L, the content of 10% yttrium-containing ZrO$_2$ was 30 g/L, and the content of barium in terms of BaO was 0.5 g/L. This is referred to as catalyst 2D. Catalyst 2C was dried at 120° C. for 15 minutes, and then was calcined at 500° C. in the presence of the air for one hour. Thereafter, a part of the catalyst was cut, and was subjected to a thermal deterioration resistance treatment in a stream of nitrogen containing 10% moisture at 1000° C. This catalyst 2D was cut into a size of Φ20×15 mm. This is referred to as catalyst 2D-1000-15.

Catalyst 2D-1000-15 and catalyst 1B-1000-15 were incorporated into a test apparatus to measure emission. The catalysts were connected to each other in series. 2D-1000-15 was disposed on an upstream side, and 1B-1000-15 was disposed on a downstream side.

Figure 2C:
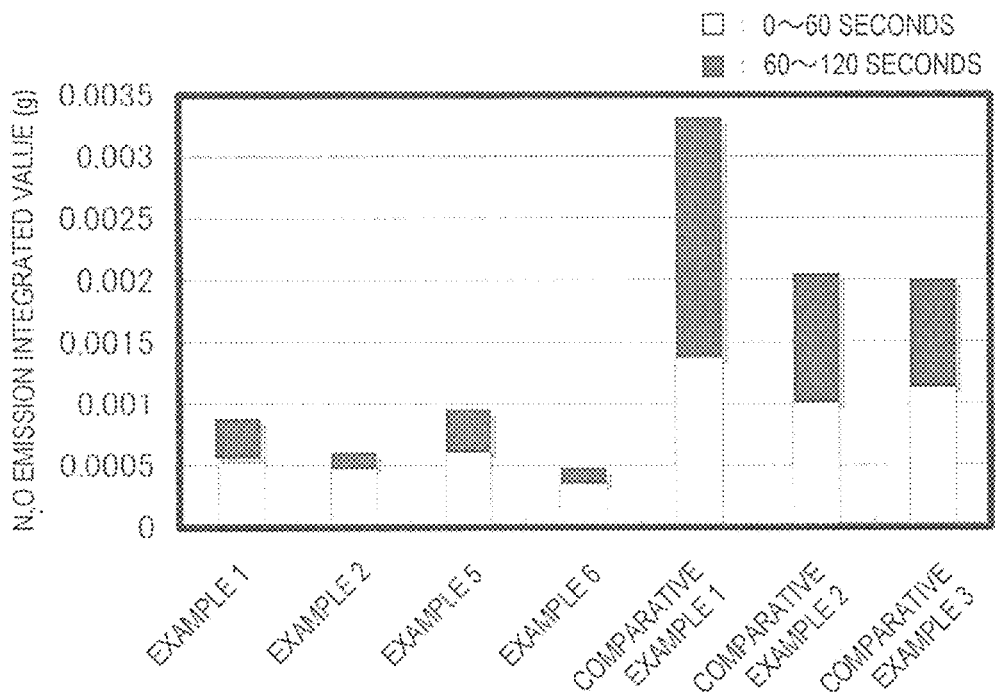
FIG. 2C is a graph indicating $N_2O$ emission integrated values in Examples 1, 2, 5, and 6 and Comparative Examples 1, 2 and 3. The test mode and the test section are similar to those in FIG. 2A.

Results in Examples 1 and 2 and Comparative Example 1 are illustrated collectively in FIGS. 2A to 2C. In Examples 1 and 2 and Comparative Example 1, the amount of a noble metal is the same as one another. It is indicated that Example 2 is superior to Example 1 regarding NOx and N$_2$O. It is considered that the length of a support coating region of rhodium is a main factor of superiority. Comparison among Example 2 and Comparative Examples 2 and 3 indicates that the palladium layer obtained by support-coating as a lower layer in Comparative Examples 2 and 3 acts disadvantageously for reducing NOx or N$_2$O. At a high temperature profile, a difference among Examples 1 and 2 and Comparative Example 1 is smaller than that at a low temperature. Superiority of Example 5 to Example 1 is not particularly recognized although the Rh layer in Example 1 contains an oxygen storage material. An effect for reducing N$_2$O in the present invention has been indicated by these Examples.

Example 3

A catalyst slurry containing rhodium at 0.235 g/L, 2% lanthanum-containing γ-Al$_2$O$_3$ at 80 g/L, 10% yttrium-containing ZrO$_2$ at 20 g/L, a solid solution containing Ce(20%)-Zr(70%)-Y(5%)-Nd(5%) at 100 g/L as an oxygen storage material, and barium in terms of BaO at 0.5 g/L was prepared. A 1 L cordierite monolithic structure having a cell density of 600 cells and a wall thickness of 4 milli (milli-inches) was support-coated with the catalyst slurry. As for the content of the catalyst component, the content of rhodium was 0.235 g/L, the content of lanthanum-containing alumina was 80 g/L, the content of yttrium-containing ZrO$_2$ was 20 g/L, the content of the oxygen storage material was 100 g/L, and barium in terms of BaO was 0.5 g/L. This is referred to as catalyst F. Catalyst F was dried at 120° C. for 15 minutes, and then was calcined at 500° C. in the presence of the air for one hour. Thereafter, a part of the catalyst was cut, and was subjected to a thermal deterioration resistance treatment in a stream of nitrogen containing 10% moisture at 1000° C. This catalyst E was cut into a size of Φ20×30 mm. This is referred to as catalyst 3E-1000-30.

1A-1000-5 and 1B-1000-15 obtained in Example 1 and catalyst 3E-1000-30 were incorporated into a test apparatus to measure emission. The catalysts were connected to one another in series. 1A-1000-5 was disposed on an upstream side, 1B-1000-15 was disposed on a downstream side, and 3E-1000-30 was disposed on a downmost stream position.

Example 4

A catalyst slurry containing rhodium at 0.235 g/L, 2% lanthanum-containing γ-Al$_2$O$_3$ at 130 g/L, 10% yttrium-containing ZrO$_2$ at 20 g/L, a solid solution containing Ce(20%)-Zr(70%)-Y(5%)-Nd(5%) at 50 g/L as an oxygen storage material, and barium in terms of BaO at 0.5 g/L was prepared. A 1 L cordierite monolithic structure having a cell density of 600 cells and a wall thickness of 4 milli (milli-inches) was support-coated with the catalyst slurry. As for the content of the catalyst component, the content of rhodium was 0.235 g/L, the content of lanthanum-containing alumina was 130 g/L, the content of yttrium-containing ZrO$_2$ was 20 g/L, the content of the oxygen storage material was 50 g/L, and barium in terms of BaO was 0.5 g/L. This is referred to as catalyst 3E. Catalyst 3E was dried at 120° C. for 15 minutes, and then was calcined at 500° C. in the presence of the air for one hour. Thereafter, apart of the catalyst was cut, and was subjected to a thermal deterioration resistance treatment in a stream of nitrogen containing 10% moisture at 1000° C. This catalyst 4F was cut into a size of Φ20×30 mm. This is referred to as catalyst 4F-1000-30. A-1000-5 and B-1000-15 obtained in Example 1 and catalyst 4F-1000-30 were incorporated into a test apparatus to measure emission. The catalysts were connected to one another in series. 1A-1000-5 was disposed on an uppermost stream position, 1B-1000-15 was disposed on a downstream side thereof, and 4F-1000-30 was disposed on a downmost stream position.

Comparative Example 4

The system in Comparative Example 1 (1B-1000-15 on an upstream side and 1A-1000-5 on a downstream side) and 3E-1000-30 (downmost stream) prepared in Example 3 were connected to each other in series to measure emission.

Comparative Example 5

The system in Comparative Example 1 (1B-1000-15 on an upstream side and 1A-1000-5 on a downstream side) and 4F-1000-30 (downmost stream) prepared in Example 4 were connected to each other in series to measure emission.

Example 5

A catalyst slurry containing palladium at 2.35 g/L, 2% lanthanum and 2% praseodymium-containing γ-Al$_2$O$_3$ at 70 g/L, and barium in terms of BaO at 10.0 g/L was prepared. A 1.0 L cordierite monolithic structure having a cell density of 600 cells and a wall thickness of 4 milli (milli-inches) was support-coated with the catalyst slurry. The catalyst which had been subjected to support-coating contained palladium at 2.35 g/L, lanthanum and praseodymium-containing alumina at 70 g/L, and barium in terms of BaO at 10.0 g/L. This is referred to as catalyst 6I. Catalyst 6I was dried at 120° C. for 15 minutes, and then was calcined at 500° C. in the presence of the air for one hour. Thereafter, each of catalyst 6I was subjected to a thermal deterioration resistance treatment in a stream of nitrogen containing 10% moisture at 1000° C. Catalyst 6I was cut into a size of Φ20×30 mm. The catalyst obtained in this way is referred to as 6I-1000-30.

Catalyst 1A-1000-5 obtained in Example and 6I-1000-30 were incorporated into a test apparatus to measure emission. The catalysts were connected to each other in series. 1A-1000-5 was disposed on an upstream side, and 6I-1000-30 was disposed on a downstream side.

Example 6

Catalyst A which had been subjected to a thermal deterioration resistance treatment in Example 1 was cut into a size of Φ20×15 mm. This catalyst is referred to as catalyst 9A-1000-15. Catalyst 9A-1000-15 and 1B-1000-15 were incorporated into a test apparatus to measure emission. The catalysts were connected to each other in series. 9A-1000-15 was disposed on an upstream side, and 1B-1000-15 was disposed on a downstream side.

Example 7

In addition to the same structure of a catalyst as in Example 6, 3E-1000-30 in Example 3 was incorporated into a test apparatus to measure emission. The catalysts were connected to one another in series. 9A-1000-15 was disposed on an upstream side, 1B-1000-15 was disposed on a downstream side, and 3E-1000-30 was disposed on a downmost stream position.

FIGS. 2A to 2C illustrate results of evaluation of the system of the region (a)+the region (b) at a test mode LT-O100-F100. FIGS. 2A to 2C illustrate results of performance evaluation of the catalyst systems in Examples 1, 2, 6, and 7 and Comparative Examples 1, 2, and 3. Comparison between Example 1 and Comparative Example 1 indicates a difference in an emission value (integrated value of a discharge amount) according to a disposition order of catalysts, and particularly indicates a significant difference in emission values of NOx and $N_2O$. Results of Comparative Examples 2 and 3 indicate results of use of a two-layer coating catalyst of rhodium and palladium which is a general three-way catalyst, and indicate a significant difference in emission values of NOx and $N_2O$. Although Comparative Example 3 has a system having the same length as in Example 2 and uses each of rhodium and palladium in an amount twice that in Example 2, there is a significant difference in a discharge amount of $N_2O$. Superiority of the present system is indicated. These examples indicate an effect of the catalyst system region (a)+region (b) in the present invention.

Comparison among Examples 1, 2, 5, and 6 indicates that an emission value is influenced by changing the concentration and the length in the region (a)+the region (b). However, in any case, values of NOx and $N_2O$ are kept low. FIGS. 4A to 4C, FIGS. 5A to 5C, and FIGS. 6A to 6C indicate an effect of the concentration and the length in the region (a) and an effect of the length in the region (b).

Figure 3A:
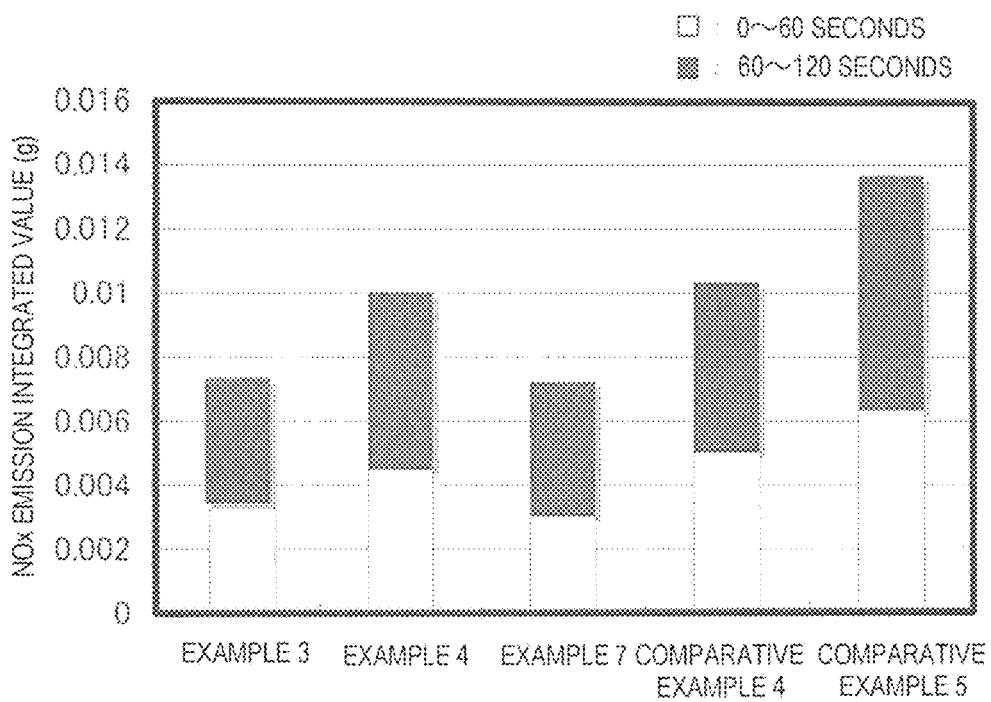
FIG. 3A is a graph indicating NOx emission integrated values in Examples 3, 4, and 7 and Comparative Examples 4 and 5. A test mode LT-O100-F100 was used. These are results in a test section of 0 to 120 seconds.
Figure 3B:
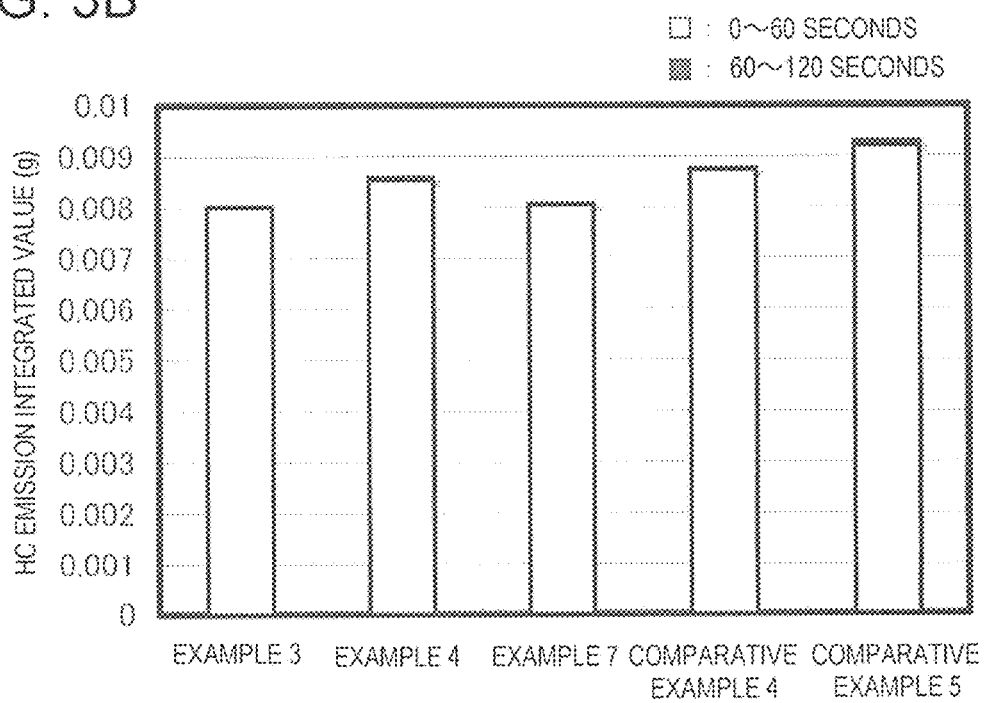
FIG. 3B is a graph indicating HC emission integrated values in Examples 3, 4, and 7 and Comparative Examples 4 and 5. The test mode and the test section are similar to those in FIG. 3A.
Figure 3C:
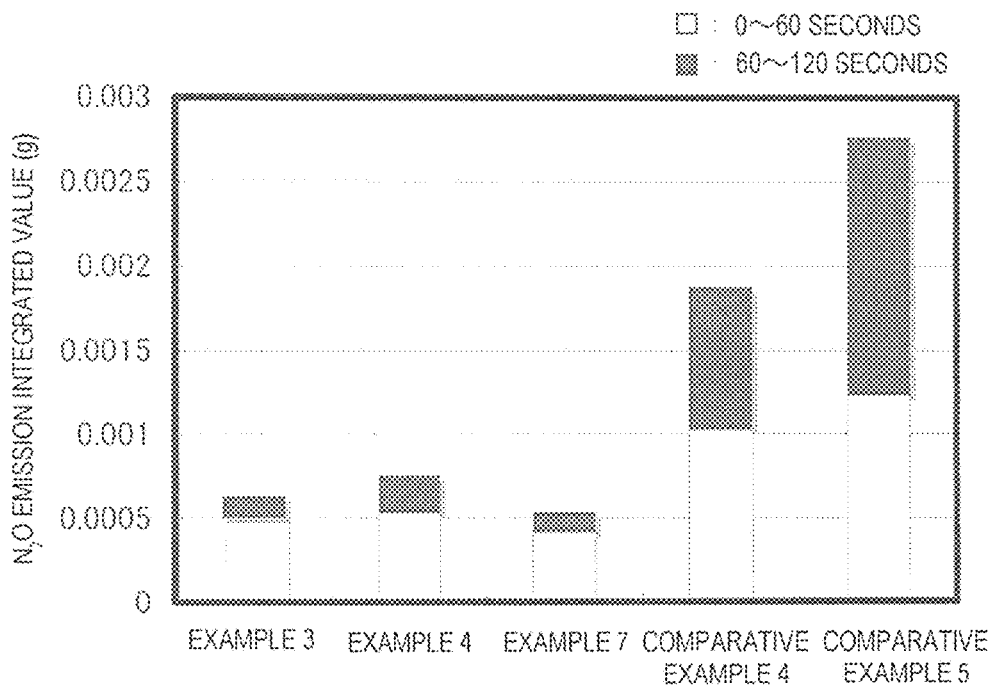
FIG. 3C is a graph indicating $N_2O$ emission integrated values in Examples 3, 4, and 7 and Comparative Examples 4 and 5. The test mode and the test section are similar to those in FIG. 3A.

FIGS. 3A to 3C illustrate results of evaluation of a system of the region (a)+the region (b)+the region (c) and a system of the region (a)+the region (b)+the region (c) at the test mode LT-O100-F100. FIGS. 3A to 3C illustrate results of performance evaluation of the catalyst systems in Examples 3, 4, and 7 and Comparative Examples 5 and 6. Examples 3 and 4 indicate that addition of the region (c) further reduces an emission value of the catalyst system of the present invention largely.

Dependence on an addition amount of an oxygen storage material is significant. An addition amount of an oxygen storage material at 100 g/L is significantly superior to an addition amount thereof at 50 g/L. In these Examples and Comparative Examples, there is a large difference in emission values of NOx and $N_2O$, and an efficacy of the catalyst system of the present invention has been indicated.

The following Examples exemplify an effect of the length of the region (a).

Example 8

Using 2% lanthanum-containing γ-$Al_2O_3$ powder having 5% by mass rhodium supported (product calcined at 500° C. after rhodium is supported thereon), various catalysts having different concentrations of rhodium were prepared.

Using the same rhodium-supported powder, an addition amount thereof to a catalyst composition was changed within a wide range.

A catalyst slurry was prepared by adjusting an addition amount of 2% lanthanum-containing γ-$Al_2O_3$ powder according to an addition amount of rhodium-supported alumina powder so as to obtain the same coating amount. A 1.0 L cordierite monolithic structure having a cell density of 600 cells and a wall thickness of 4 milli (milli-inches) was support-coated with the catalyst slurry in a similar manner to the above Examples. The resulting catalyst was dried at 120° C., and then was calcined at 500° C. for one hour.

Thereafter, each of catalysts 1A and 1B was subjected to a thermal deterioration resistance treatment in a stream of nitrogen containing 10% moisture at 1000° C.

As for the content of the catalyst component, the content of rhodium was as follows (refer to the following Table), the content of lanthanum-containing alumina was 140 g/L, the content of 10% yttrium Y-containing $ZrO_2$ was 30 g/L, and the content of barium in terms of BaO was 0.5 g/L.

The catalysts were cut to adjust the lengths thereof such that the contents of rhodium in the catalysts were the same as one another. Specifications of the prepared catalysts (R1 to R7) are shown in Table 2.

TABLE 2

| | specifications of catalysts | | | |
|---|---|---|---|---|
| name of catalyst | Rh (g/L) | length after cutting (mm) φ20 | content of Rh (mg) | expression of cut catalyst |
| R1 | 0.059 | 60 | 1.11 | R1-1000-60 |
| R2 | 0.118 | 30 | 1.11 | R2-1000-30 |
| R3 | 0.235 | 15 | 1.11 | R3-1000-15 |
| R4 | 0.470 | 7.5 | 1.11 | R4-1000-7.5 |
| R5 | 0.705 | 5.0 | 1.11 | R5-1000-5.0 |
| R6 | 1.410 | 2.5 | 1.11 | R6-1000-2.5 |
| R7 | 2.820 | 1.25 | 1.11 | R7-1000-1.25 |

Catalyst 1B (described in Example 1) which had been subjected to a thermal deterioration resistance treatment in a stream of nitrogen containing 10% moisture at 1000° C. was cut into a size of Φ320×30 (mm).

These catalysts were incorporated into a test apparatus to measure emission. The catalysts were connected to each other in series. Any one of the cut products of R1 to R7 was disposed on an upstream side, and 1B-1000-30 was disposed on a downstream side.

Figure 4A:
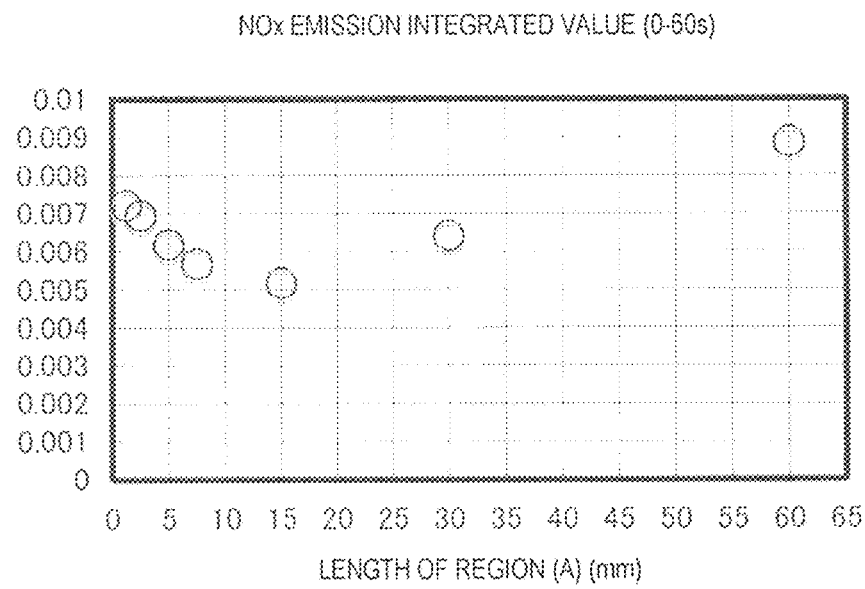
FIG. 4A is a graph indicating NOx emission integrated values in Example 8. An effect of a length of a region (A) was studied with the same amount of a noble metal. A test mode LT-O100-F100 was used. These are results in a test section of 0 to 60 seconds.
Figure 4B:
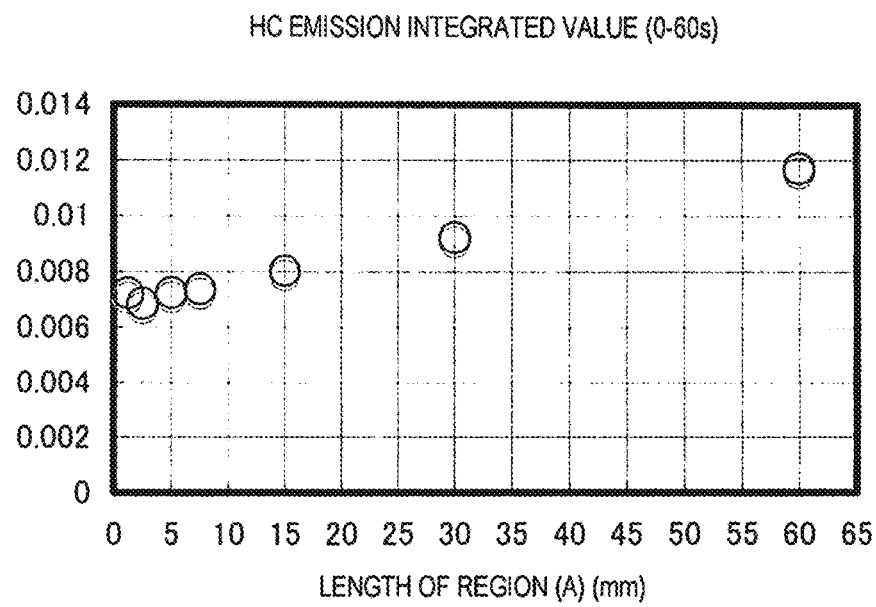
FIG. 4B is a graph indicating HC emission integrated values in Example 8. The test mode and the test section are similar to those in FIG. 4A.
Figure 4C:
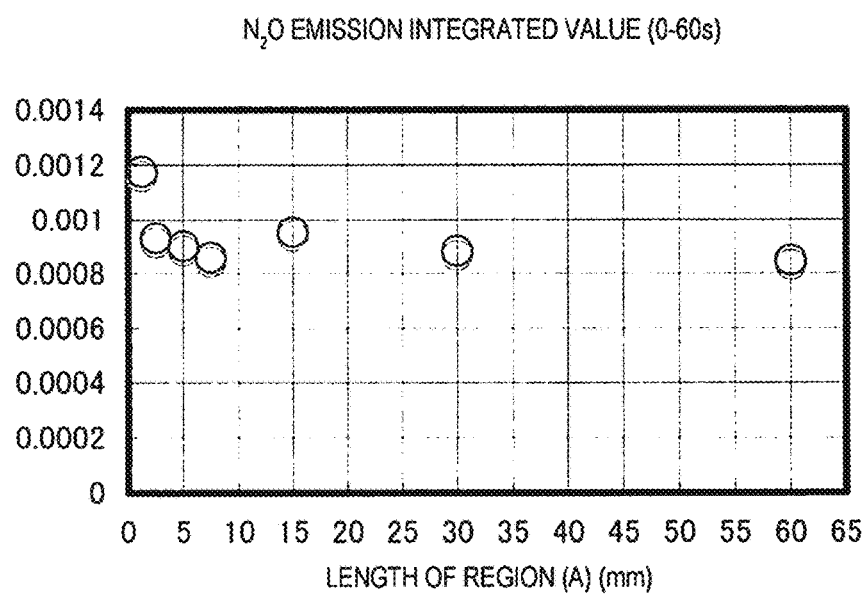
FIG. 4C is a graph indicating $N_2O$ emission integrated values in Example 8. The test mode and the test section are similar to those in FIG. 4A.

FIGS. 4A to 4C illustrate results of emission measurement at LT-O100-F100. In any catalyst system, an emission value is influenced by the length of the region (a) in spite of the same amount of a noble metal. An emission value of NOx has a minimum value with respect to the length of the region (a). An emission value of $N_2O$ is decreased with an increase in the length of the region (a) of about 3 to 5 mm. Further reduction is not observed in a longer length.

It is considered that a longer length makes an emission value of NOx higher and makes a conversion ratio of NOx lower, resulting in suppression of formation of $N_2O$.

An increase in the length of the region (a) increases an emission value of HC, but the increase in the emission value of HC is not large in the length of about 20 to 30 mm.

The following Examples indicate an effect of the length of the region (b).

Example 9

2D-1000-15 which had been subjected to a durability treatment in Example 2 was disposed on an upstream side, and catalyst 1B-1000 which had been prepared and subjected to a durability treatment in Example 1 was disposed on a downstream side to perform emission measurement. At this time, effects of three conditions, the lengths of catalyst 1B-1000 on a downstream side, 15 mm, 30 mm, and 45 mm on emission were examined.

These are referred to as 1B-1000-15, 1B-1000-30, and 1B-1000-45, respectively.

Figure 5A:
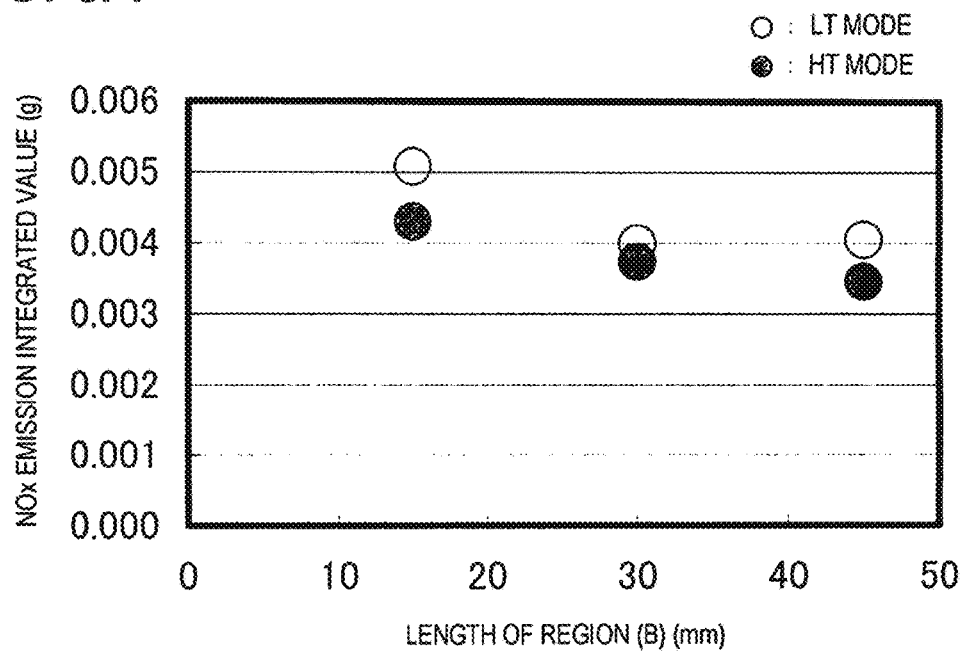
FIG. 5A is a graph indicating NOx emission integrated values in Example 9. An effect of a length of a region (B) was studied with the same concentration of a noble metal. Test modes LT-O100-F100 and HT-O100-F100 were used. These are results in a test section of 0 to 60 seconds.
Figure 5B:
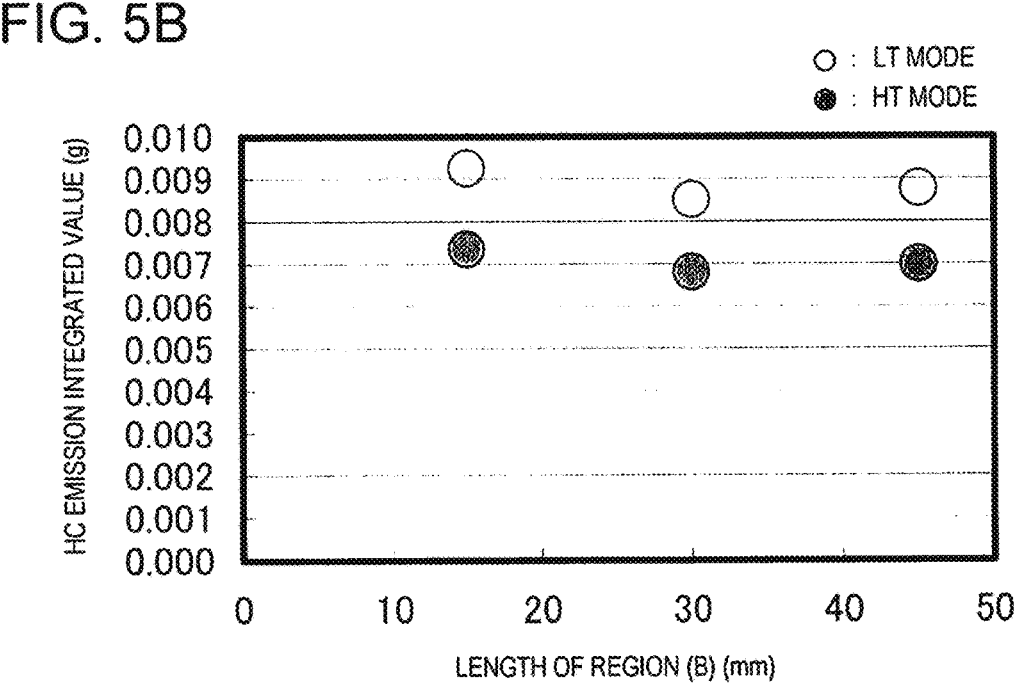
FIG. 5B is a graph indicating HC emission integrated values in Example 9. An effect of a length of a region (B) was studied with the same concentration of a noble metal. The test mode is similar to that in FIG. 5A. These are results in a test section of 0 to 60 seconds.
Figure 5C:
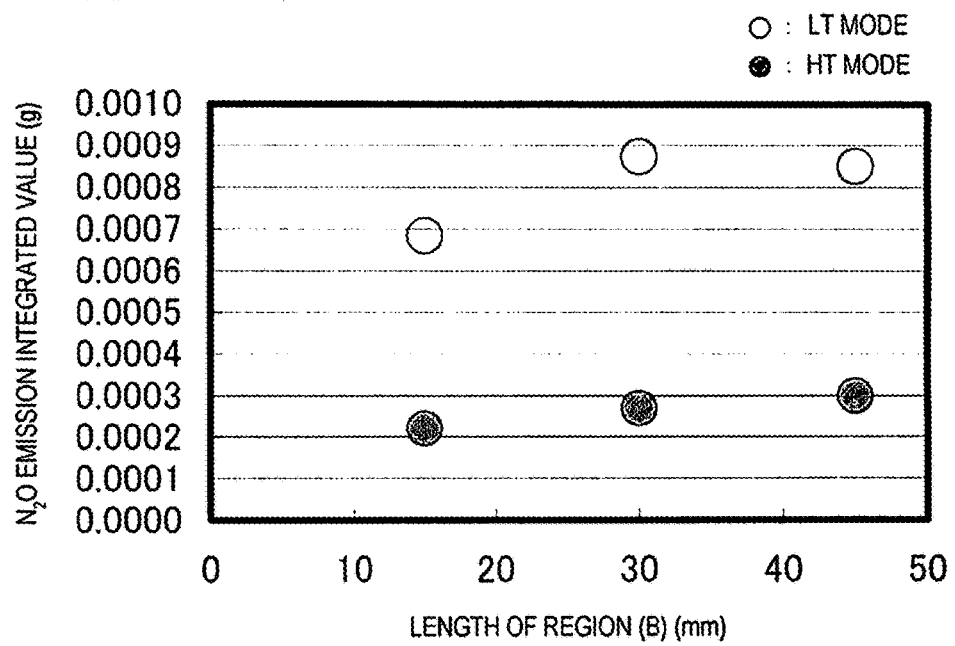
FIG. 5C is a graph indicating $N_2O$ emission integrated values in Example 9. An effect of a length of a region (B) was studied with the same concentration of a noble metal. The test mode is similar to that in FIG. 5A. These are results in a test section of 0 to 60 seconds.

FIGS. 5A to 5C illustrate results thereof. In each of NOx and HC, a longer length of the region (b) made an emission value lower.

It is indicated that a high temperature profile (HT pattern) is particularly effective for reducing HC. Meanwhile, in $N_2O$, a longer length of the region (b) made an emission value higher. It is considered that this is because the amount of $N_2O$ as a byproduct due to progress of purification of NOx was increased. The concentration of a noble metal was constant, and therefore the content of the noble metal was increased with an increase in the length, but an emission value of $N_2O$ was reduced largely at a high temperature profile. It has been indicated that temperature profile characteristic at the time of cold starting has a large influence on suppression of formation of $N_2O$ in the catalyst system of the present invention.

When a test profile section of 0 to 60 seconds is evaluated, FIGS. 5A to 5C indicate that the length of the region (b) of about 10 to 60 mm has an effect for reducing emission.

A gas flow rate is increased in a high speed driving region. Therefore, the length of the region (b) can be adjusted appropriately, and a length of about 10 to 100 mm is necessary.

The following Examples indicate an effect of the concentration of rhodium in the region (a).

Example 10

An effect of the concentration of rhodium in the region (a) on an emission value was examined. Three types of catalysts R3-1000-15, R6-1000-15, and R7-1000-15 prepared in Example 8 were used on an upstream side.

Each of these catalysts was cut into a length of 15 mm. Catalyst (1B-1000-30) obtained by cutting catalyst 1B-1000 which had been prepared and subjected to a durability treatment in Example 1 into a size of 30 mm was disposed on a downstream side to perform emission measurement.

Figure 6A:
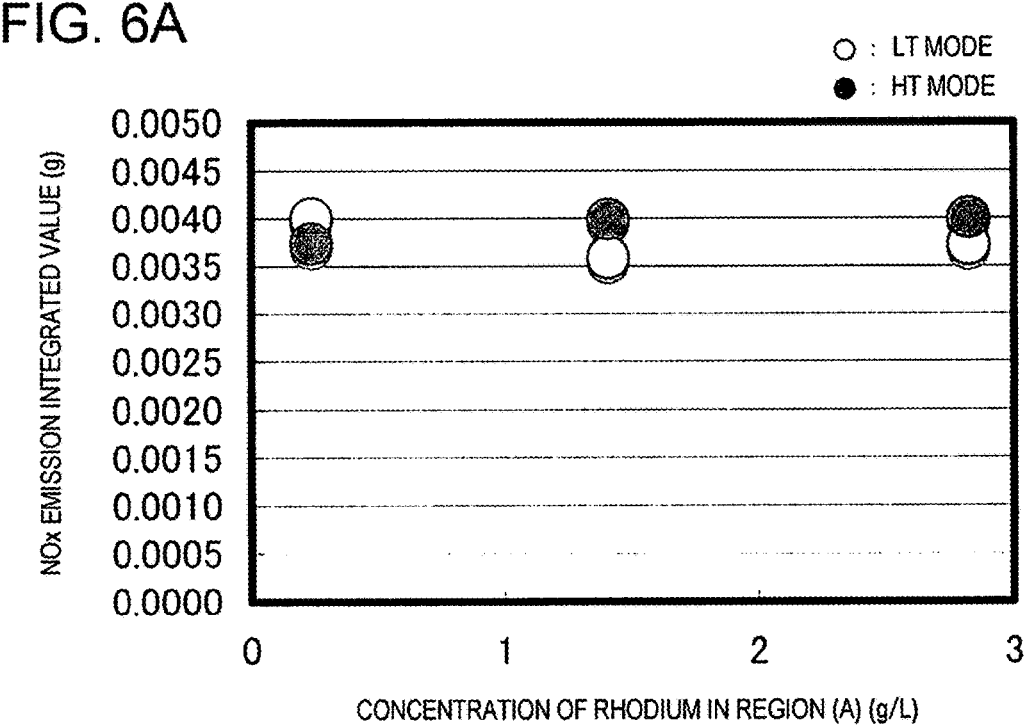
FIG. 6A is a graph indicating NOx emission integrated values in Example 10. An effect of a concentration of a noble metal was studied by fixing the length of the region (A). Test modes LT-O100-F100 and HT-O100-F100 were used. These are results in a test section of 0 to 60 seconds.
Figure 6B:
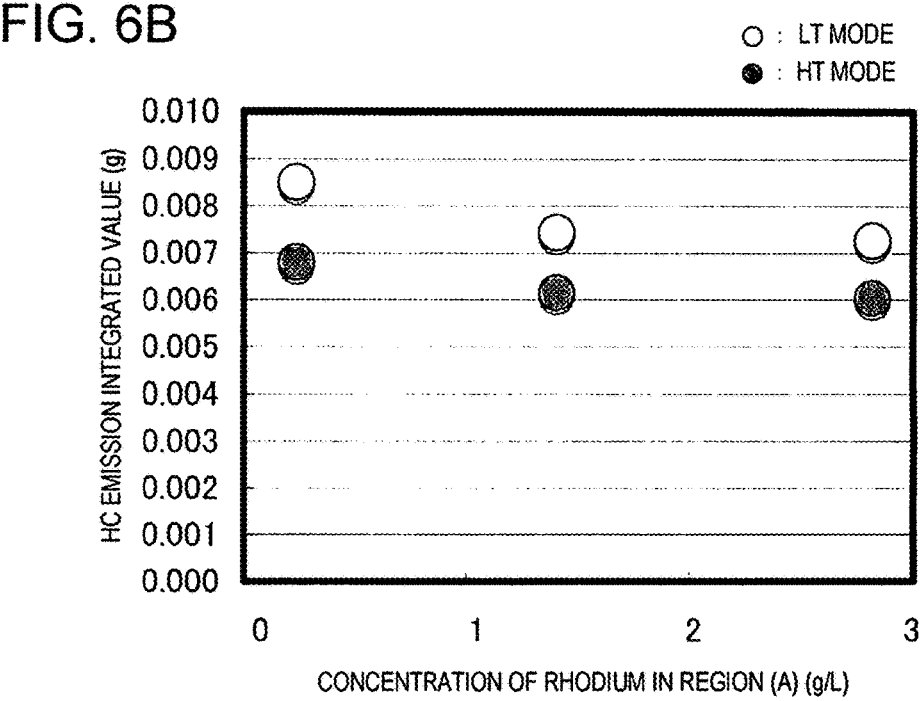
FIG. 6B is a graph indicating HC emission integrated values in Example 10. An effect of a concentration of a noble metal was studied by fixing the length of the region (A). The test mode and the test section are similar to those in FIG. 6A.
Figure 6C:
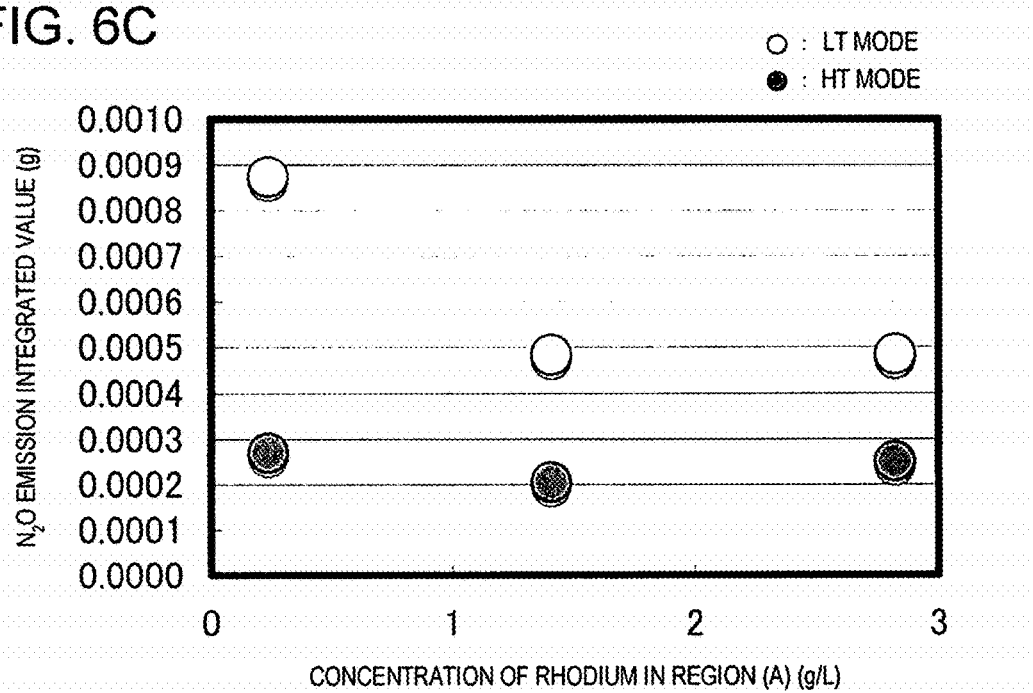
FIG. 6C is a graph indicating $N_2O$ emission integrated values in Example 10. An effect of a concentration of a noble metal was studied by fixing the length of the region (A). The test mode and the test section are similar to those in FIG. 6A.
Figure 7A:
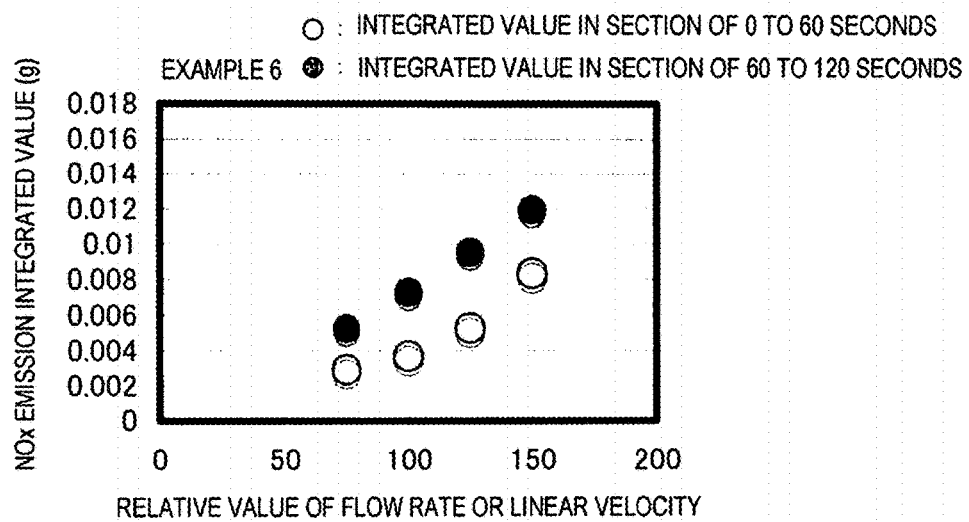
FIG. 7A is a graph illustrating a relation between a flow rate and NOx emission in Example 6, in which the points indicate results obtained by performing a test mode of LT-O100 by changing the flow rate at the test mode under conditions of F75, F100, F125, and F150.
Figure 7B:
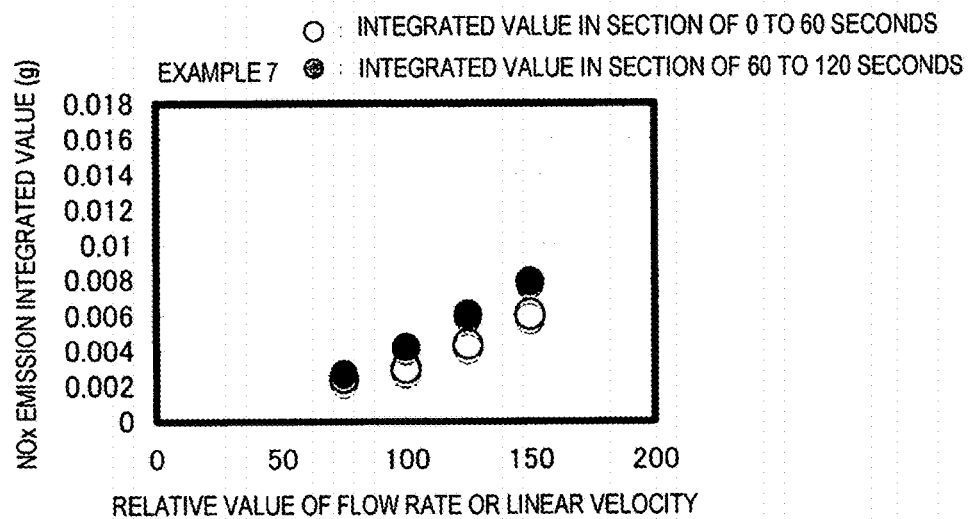
FIG. 7B is a graph illustrating a relation between a flow rate and NOx emission in Example 7, in which the points indicate results obtained by performing a test mode of LT-O100 by changing the flow rate at the test mode under conditions of F75, F100, F125, and F150.
Figure 8A:
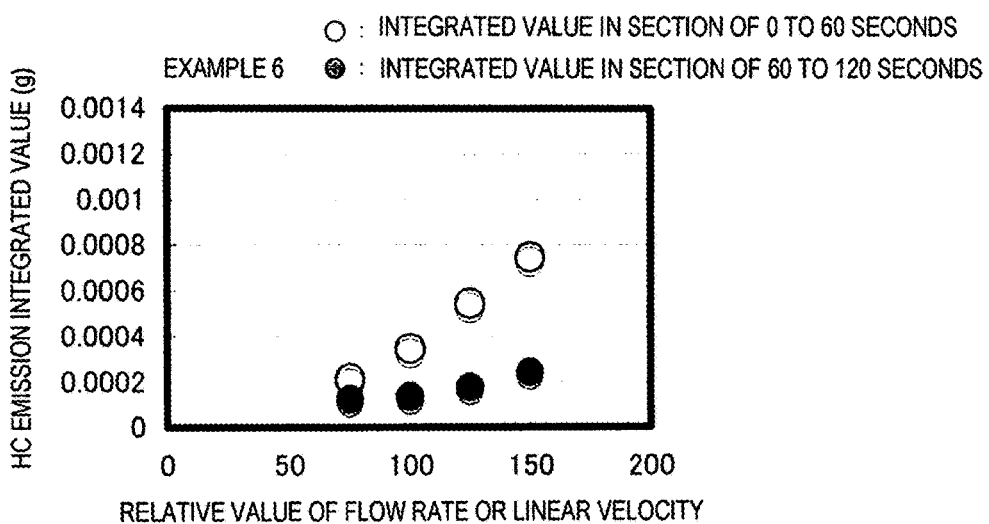
FIG. 8A is a graph illustrating a relation between a flow rate and HC emission in Example 6, in which the points indicate results obtained by performing a test mode of LT-O100 by changing the flow rate at the test mode under conditions of F75, F100, F125, and F150.
Figure 8B:
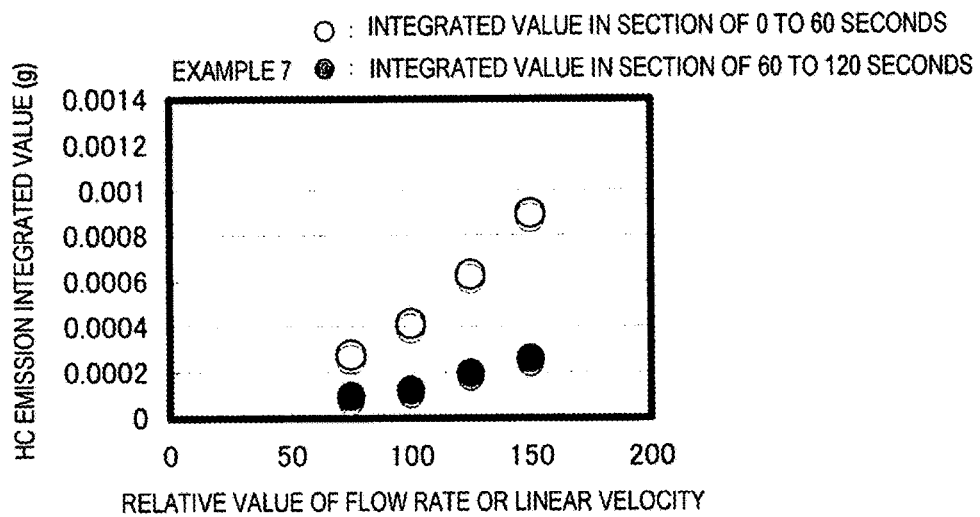
FIG. 8B is a graph illustrating a relation between a flow rate and HC emission in Example 7, in which the points indicate results obtained by performing a test mode of LT-O100 by changing the flow rate at the test mode under conditions of F75, F100, F125, and F150.
Figure 9A:
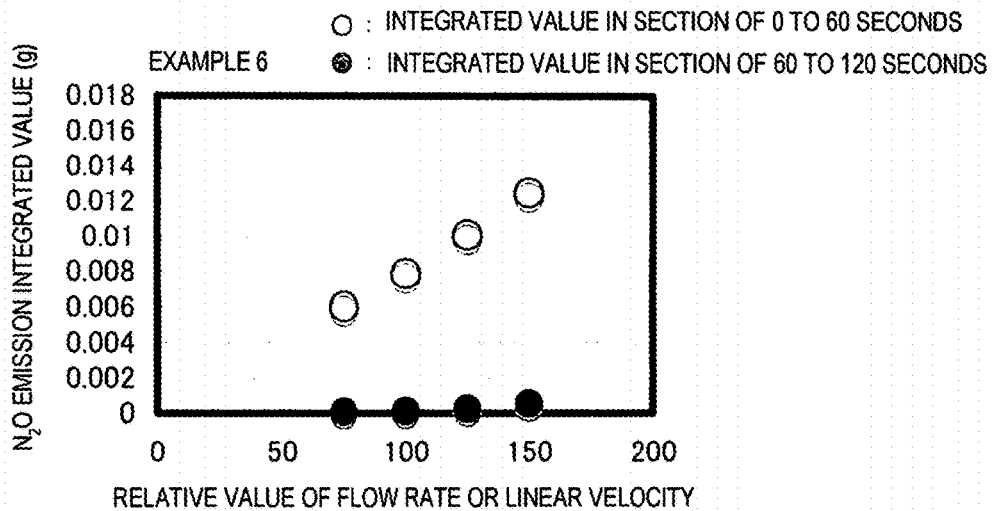
FIG. 9A is a graph illustrating a relation between a flow rate and $N_2O$ emission in Example 6, in which the points indicate results obtained by performing a test mode of LT-O100 by changing a flow rate at the test mode under conditions of F75, F100, F125, and F150.
Figure 9B:
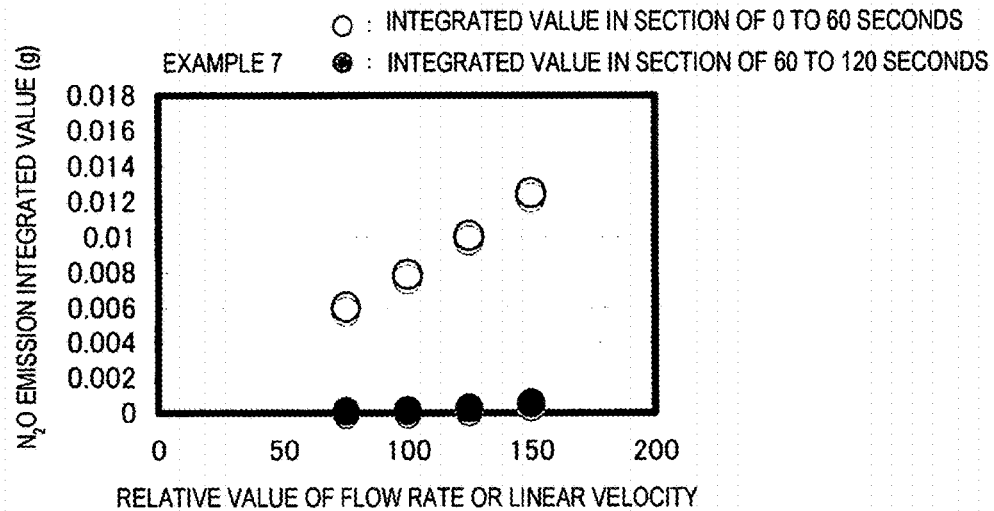
FIG. 9B is a graph illustrating a relation between a flow rate and $N_2O$ emission in Example 7, in which the points indicate results obtained by performing a test mode of LT-O100 by changing a flow rate at the test mode under conditions of F75, F100, F125, and F150.
Figure 10A:
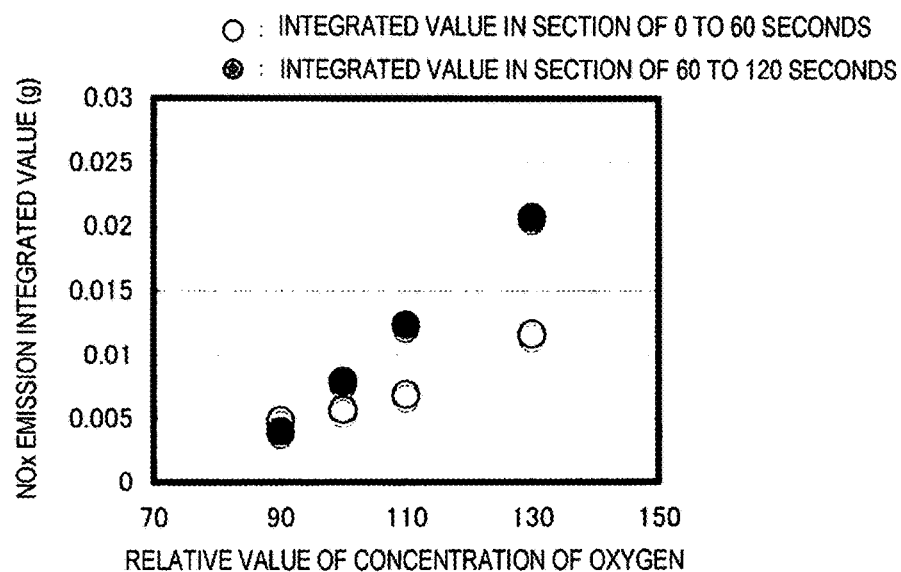
FIG. 10A is a graph illustrating a relation between a flow rate and NOx emission in Example 1, in which the points indicate results obtained by performing a test mode of LT-F100 by changing only a concentration of oxygen at the test mode under conditions of O90, O100, O110, and O130.
Figure 10B:
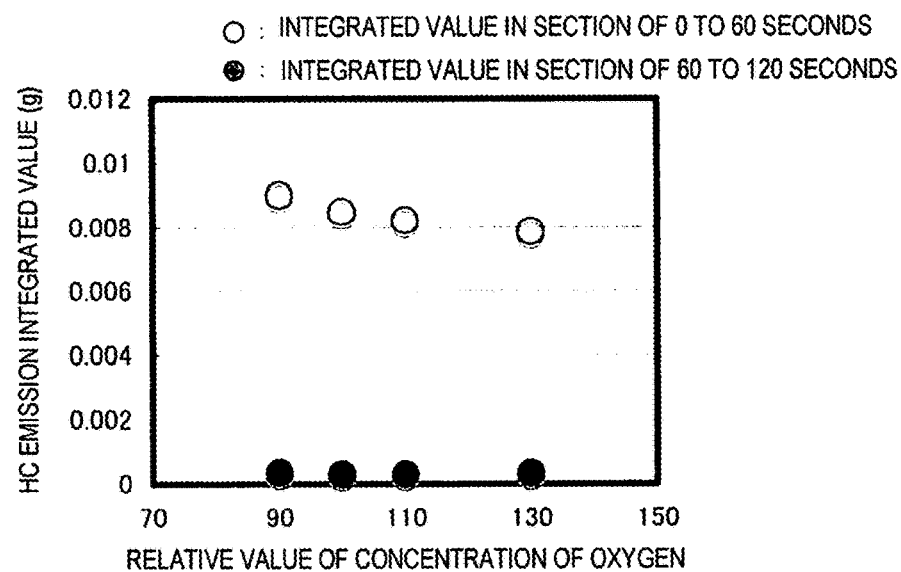
FIG. 10B is a graph illustrating a relation of HC emission in Example 1, in which the points indicate results obtained by performing a test mode of LT-F100 by changing only a concentration of oxygen at the test mode under conditions of O90, O100, O110, and O130.
Figure 10C:
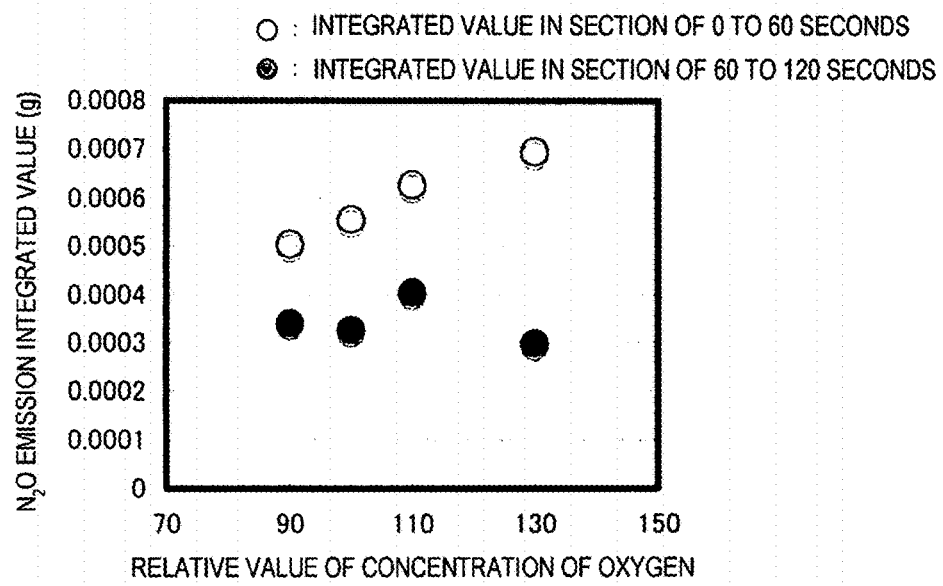
FIG. 10C is a graph illustrating a relation of $N_2O$ emission in Example 1, in which the points indicate results obtained by performing a test mode of LT-F100 by changing only a concentration of oxygen at the test mode under conditions of O90, O100, O110, and O130.
Figure 11A:
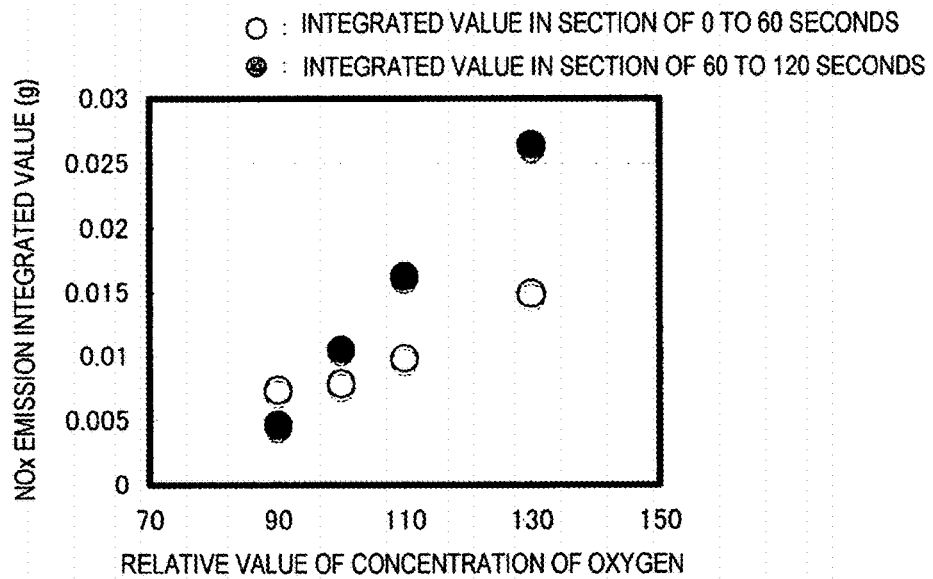
FIG. 11A is a graph illustrating a relation between a flow rate and NOx emission in Comparative Example 1, in which the points indicate results obtained by performing a test mode of LT-F100 by changing only a concentration of oxygen at the test mode under conditions of O90, O100, O110, and O130.
Figure 11B:
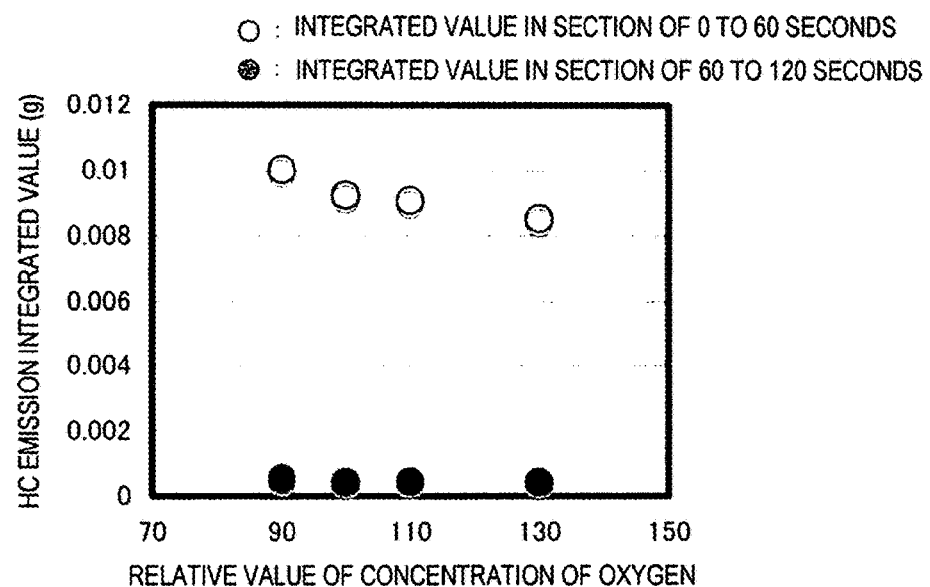
FIG. 11B is a graph illustrating a relation of HC emission, in which the points indicate results obtained by performing a test mode of LT-F100 by changing only a concentration of oxygen at the test mode under conditions of O90, O100, O110, and O130.
Figure 11C:
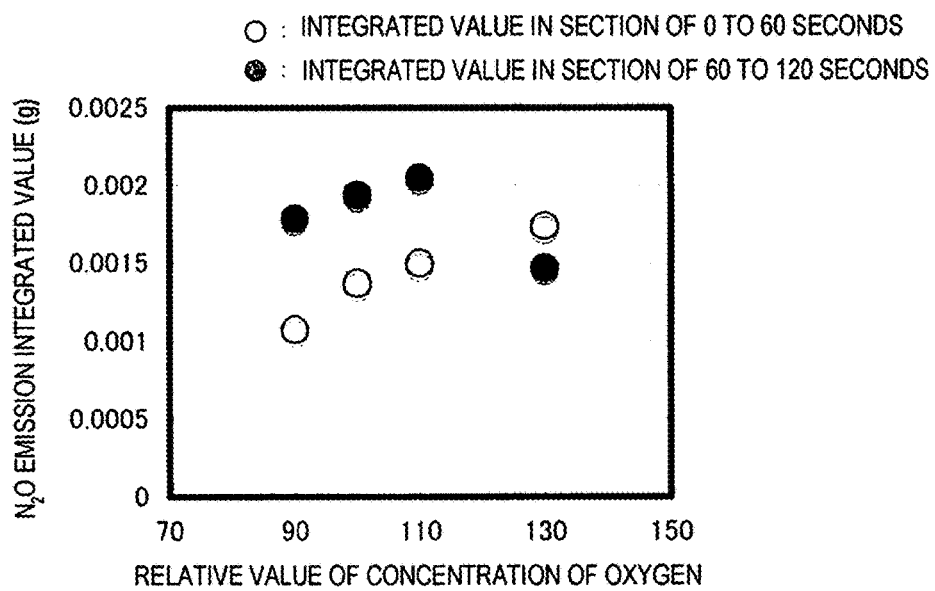
FIG. 11C is a graph illustrating a relation of $N_2O$ emission, in which the points indicate results obtained by performing a test mode of LT-F100 by changing only a concentration of oxygen at the test mode under conditions of O90, O100, O110, and O130.
Figure 12A:
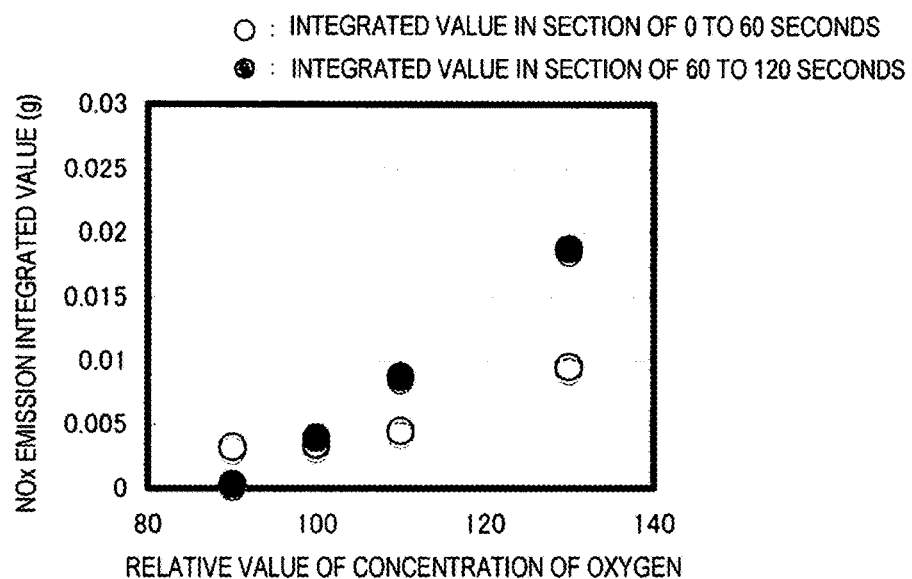
FIG. 12A is a graph illustrating a relation between a flow rate and NOx emission in Example 3, in which the points indicate results obtained by performing a test mode of LT-F100 by changing only a concentration of oxygen at the test mode under conditions of O90, O100, O110, and O130.
Figure 12B:
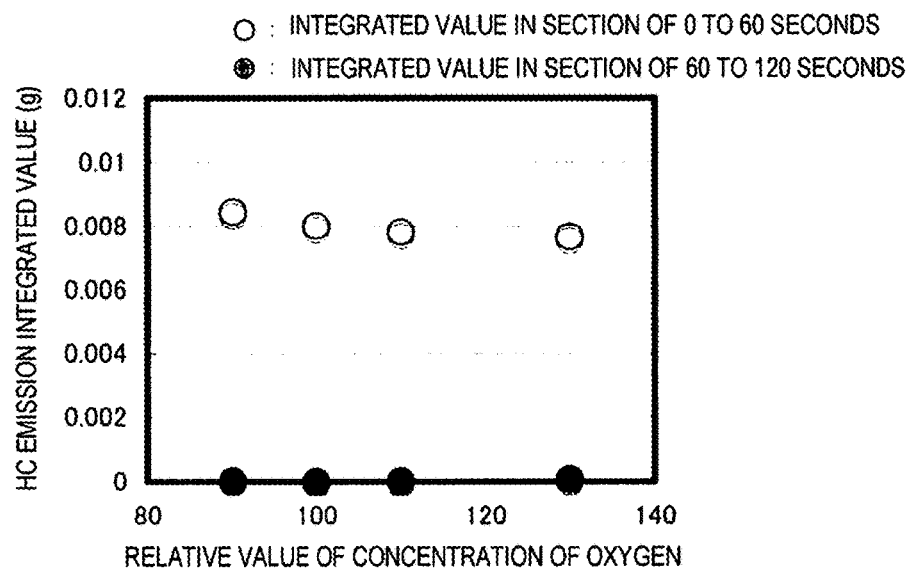
FIG. 12B is a graph illustrating a relation between a flow rate and HC emission in Example 3, in which the points indicate results obtained by performing a test mode of LT-F100 by changing only a concentration of oxygen at the test mode under conditions of O90, O100, O110, and O130.
Figure 12C:
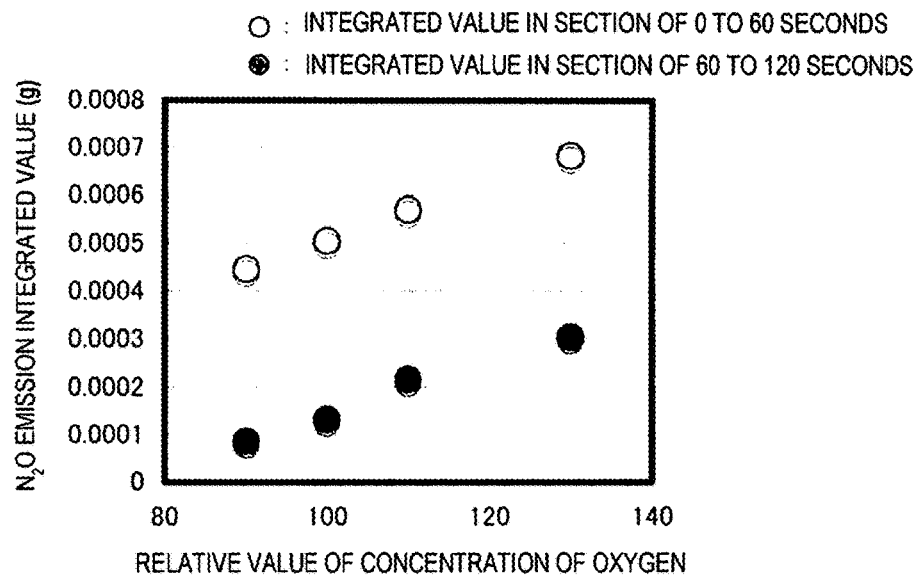
FIG. 12C is a graph illustrating a relation between a flow rate and $N_2O$ emission in Example 3, in which the points indicate results obtained by performing a test mode of LT-F100 by changing only a concentration of oxygen at the test mode under conditions of O90, O100, O110, and O130.

FIGS. 6A to 6C illustrate results thereof.

An increase in the concentration of rhodium reduces emission. However, it is indicated that the effect for NOx is relatively small but an effect for reducing $N_2O$ or HC is large. At a high temperature profile, any component is effective for further reduction, and particularly has a large effect for reducing $N_2O$. The concentration of rhodium in the region (a) has an effect for reducing emission by increasing the concentration to about 2 (g/L), but the effect for reduction is small by further increasing the concentration, and such an increase is not economical.

The following examples indicate effects of an exhaust gas flow rate and an concentration of oxygen in the catalyst system of the present invention. The concentration of oxygen has a close relation to a stoichiometric ratio. This means that the concentration of oxygen changes an air-fuel ratio in engine control.

FIGS. 7A and 7B, FIGS. 8A and 8B, and FIGS. 9A and 9B indicate results obtained by examining an effect of a flow rate on an emission integrated value in the catalyst of the present invention. Plotting was performed in each of a section of 0 to 60 seconds and a section of 60 to 120 seconds. It is indicated that addition of the region (c) keeps an increase in an emission integrated value with respect to a flow rate small.

FIGS. 10A to 10C, FIG. 11A to 11C, and FIGS. 12A to 12C indicate a relation between a relative concentration of oxygen and emission in test driving in Example 1, Comparative Example 1, and Example 3, respectively.

In Examples, nitrous oxide is suppressed within a wider range of the concentration of oxygen and has a better result in each of NOx and HC than in Comparative Example.

TABLE 3 specifications of catalysts

| name of catalyst | length (mm) | volume of catalyst (cc) | content of Rh (mg) | content of Pd (mg) | content of oxygen storage material (mg) | the numbers of Example and Comparative Example |
|---|---|---|---|---|---|---|
| 1A-1000-5 | 5 | 1.57 | 1.11 | 0.00 | 0 | Example 1, 3, 4, 5 Comparative Example 1, 4, 5 |
| 1B-1000-15 | 15 | 4.71 | 0.00 | 22.14 | 0 | Example 1, 2, 3, 4, 6, 7 Comparative Example 1, 4, 5 |
| 2D-1000-15 | 15 | 4.71 | 1.11 | 0.00 | 0 | Example 2 |
| 3E-1000-30 | 30 | 9.42 | 2.21 | 0.00 | 942 | Example 3, 7 Comparative Example 4 |
| 4F-1000-30 | 30 | 9.42 | 2.21 | 0.00 | 471 | Example 4 Comparative Example 5 |
| 6I-1000-30 | 30 | 9.42 | 0.00 | 22.14 | 0 | Example 5 |
| 9A-1000-15 | 15 | 4.71 | 3.32 | 0.00 | 0 | Example 6, 7 |
| 2C-1000-15 | 15 | 4.71 | 1.11 | 22.14 | 0 | Comparative Example 2 |

TABLE 3-continued specifications of catalysts

| name of catalyst | length (mm) | volume of catalyst (cc) | content of Rh (mg) | content of Pd (mg) | content of oxygen storage material (mg) | the numbers of Example and Comparative Example |
|---|---|---|---|---|---|---|
| 2C-1000-30 | 30 | 9.42 | 2.21 | 44.27 | 0 | Comparative Example 3 |
| 4G-1000-30 | 30 | 9.42 | 2.21 | 0.00 | 0 | Comparative Example 4 | specifications of catalysts used in Examples 1 to 7 and Comparative Examples 1 to 5 (specifications of only noble metal and oxygen storage material are shown)

Example 11

R3-1000-15 prepared in Example 8 was disposed on an uppermost stream position, 2C-1000-15 prepared in Comparative Example 2 was disposed on a downstream side thereof, and 1B-1000-15 prepared in Example 1 was disposed on a downmost stream position be connected to one another in series, and emission was measured. The total length of the catalyst was 45 milli.

Example 12

A two-layer support coating catalyst was prepared on a 1.0 L cordierite monolithic structure having a cell density of 600 cells and a wall thickness of 4 milli (milli-inches). A catalyst slurry containing rhodium at 0.705 g/L, 2%. La-containing γ-$Al_2O_3$ at 140 g/L, 10% yttrium-containing $ZrO_2$ at 30 g/L, and barium in terms of BaO at 0.5 g/L was prepared. A lower layer was support-coated with the palladium-containing slurry used in Example 1 in the same amount as in Example 1, and the resulting product was dried and calcined under the same conditions as in Example 1. An upper layer was support-coated with the rhodium-containing slurry prepared in the present Example so as to include rhodium at 0.705 g/L, and the resulting product was dried and calcined under the same conditions. This is referred to as catalyst 12J. Catalyst 2C was subjected to a thermal deterioration resistance treatment under the same conditions as in Example 1. This catalyst was cut into a size of Φ20×30 mm. The catalyst obtained in this way is referred to as 12J-1000-30.

R5-1000-5 prepared in Example 8 was disposed on an uppermost stream position, 12J-1000-30 was disposed on a downstream side thereof, and 1B-1000-30 prepared in Example 10 was disposed on a downmost stream position to be connected to one another in series, and emission was measured.

Each of Examples 11 and 12 has a structure in which only rhodium is contained in an uppermost stream, a two-layer coating catalyst is disposed in a middle stage, and a palladium catalyst is disposed on a downstream.

Such a coating form is one example of the present invention. This simulates a monolithic catalyst in which an end of a monolithic support is support-coated with a rhodium-containing catalyst, the other end is support-coated with a palladium-containing catalyst, and these portions overlap each other in the middle of the integrated article.

Figure 14A:
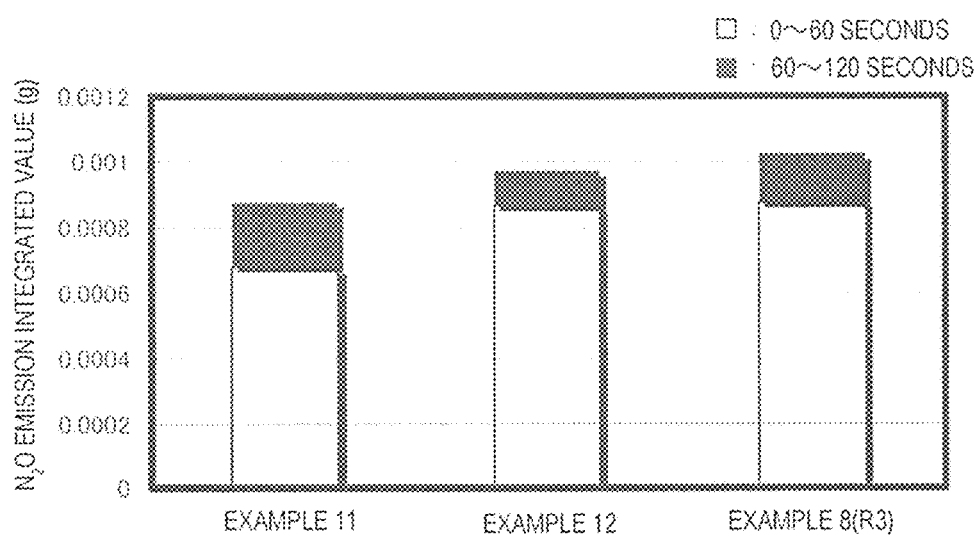
FIG. 14A is a graph indicating $N_2O$ emission integrated values in Examples 11 and 12. A test mode LT-O90-F100 was used. These are results in test sections of 0 to 60 seconds and 60 to 120 seconds.
Figure 14B:
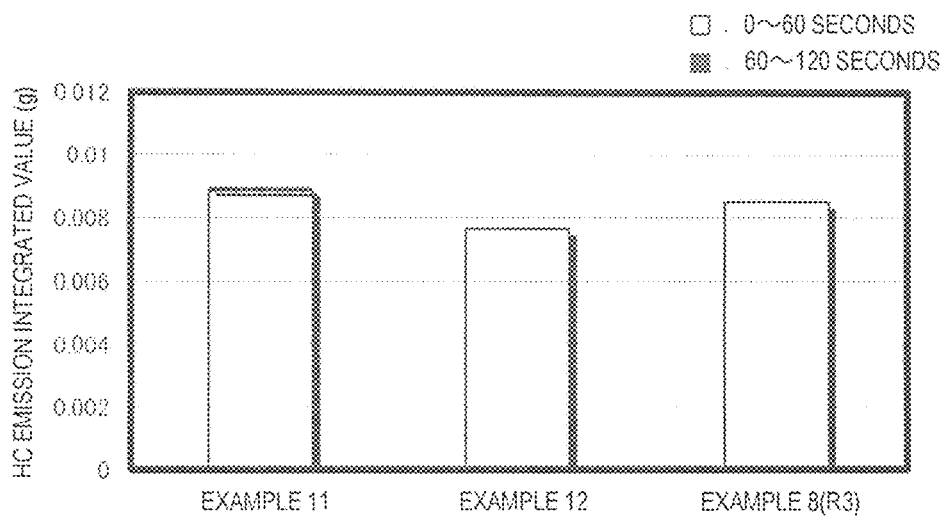
FIG. 14B is a graph indicating HC emission integrated values in Examples 11 and 12. The test mode and the test section are similar to those in FIG. 14A.
Figure 14C:
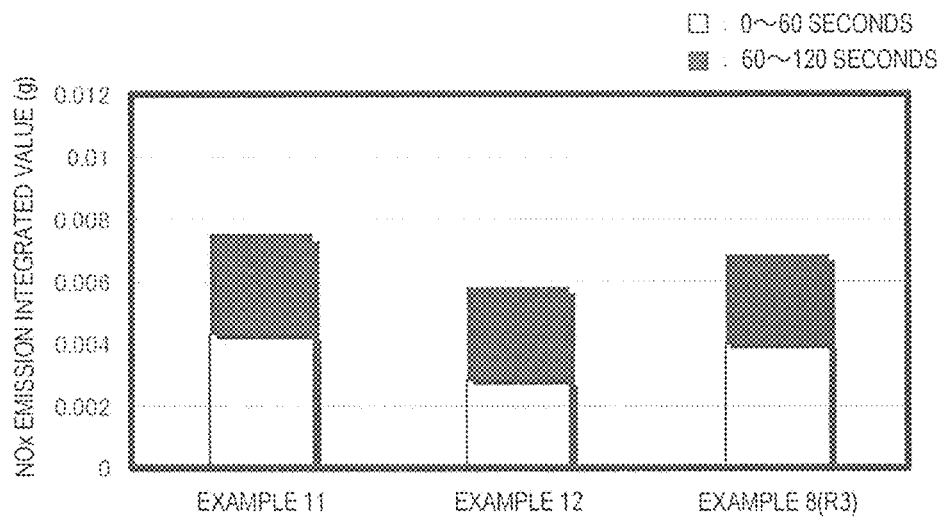
FIG. 14C is a graph indicating NOx emission integrated values in Examples 11 and 12. The test mode and the test section are similar to those in FIG. 14A.

FIGS. 14A to 14C illustrate test results. Test pattern LT-090-F100 was used.

FIGS. 14A to 14C also illustrate a performance result of the catalyst system obtained by connecting R3-1000-15 (upstream) and 1B-1000-30 (downstream) in Example 8 for reference.

Such a catalyst system as indicated in Example 11 or 12 also has an effect for reducing emission, equal to the catalyst system of the present invention.

The present invention is not limited to Examples described here, but can be performed in accordance with the contents described here.

The invention claimed is:

1. An engine proximity type monolithic catalyst for internal combustion engine exhaust gas purification, having rhodium and palladium as noble metal catalyst active components sequentially supported on a monolithic support along a flow of the exhaust gas, comprising:
at least a first catalyst component region (a) having a catalyst active component layer which substantially contains only rhodium at a concentration of 0.2 to 1.5 g/L at a length of 5 to 25 mm on an upstream side, and
a second catalyst component region (b) having a catalyst active component layer containing palladium at a concentration of 2.0 to 10.0 g/L at a length of 20 to 60 mm.

2. The catalyst according to claim 1, further comprising a third catalyst active component region (c) having a catalyst component containing rhodium at a concentration of 0.05 to 1.0 g/L and an oxygen storage material at a concentration of 30 to 150 g/L at a length of 25 to 150 rum disposed on a monolithic support in a downstream region of the first catalyst component region (a) and the second catalyst component region (b).

3. The catalyst according to claim 1, wherein the first catalyst component region (a) contains an oxygen storage material at 20 g/L or less.

4. The catalyst according to claim 1, wherein the catalyst active components are blended with a refractory inorganic oxide.

5. The catalyst according to claim 2, wherein the concentration of rhodium in the third catalyst component region (c) is from 0.1 to 0.5 g/L, and the concentration of an oxygen storage material is from 50 to 120 g/L, and the length thereof is from 30 to 100 mm.

6. The catalyst according to claim 1, wherein the second catalyst component region (b) contains at least one alkaline earth metal element.

7. The catalyst according to claim 6, wherein the alkaline earth metal element is one or both of strontium and barium, and the second catalyst component region (b) contains the alkaline earth metal element at 1.0 to 15.0 g/L in terms of an oxide thereof.

8. The catalyst according to claim 1, wherein a concentration of rhodium in the first catalyst component region (a) is from 0.037 to 6.0% by mass, and a concentration of palladium in the second catalyst component region (b) is from 0.37 to 40.0% by mass.

9. The catalyst according to claim 2, wherein the concentration of the oxygen storage material in the third catalyst component region (c) is from 10.0 to 80% by mass.

10. The catalyst according to claim 2, wherein the oxygen storage material is at least one selected from the group consisting of a solid solution or a composite oxide of cerin, zirconia, or cerium-zirconium, a cerium-zirconium-alumina composite oxide, and an oxide obtained by adding a rare earth element at 0 to 40% by mass as an additive thereto.

11. The catalyst according to claim 1, wherein the first catalyst component region (a) and the second catalyst component region (b) are formed on an integrated monolithic support.

12. The catalyst according to claim 1, wherein the first catalyst component region (a) and the second catalyst component region (b) are formed on separate monolithic supports.

13. A system for purifying internal combustion engine exhaust gas using the catalyst according to claim 1, wherein a reaching temperature in a position of upstream 1 cm in the first catalyst component region is 300° C. or higher in initial 20 seconds at the time of cold starting at 15° C. to 30° C.

14. A system for purifying internal combustion engine exhaust gas using the catalyst according to claim 1, wherein a reaching temperature in a position of upstream 1 cm in the first catalyst component region is 350° C. or higher in initial 20 seconds at the time of cold starting at 15° C. to 30° C.

* * * * *